United States Patent
Gafni et al.

(10) Patent No.: US 10,956,791 B2
(45) Date of Patent: Mar. 23, 2021

(54) INTERACTIVE GENERATION AND PUBLICATION OF AN AUGMENTED-REALITY APPLICATION

(71) Applicant: LayerJot, Inc., Menlo Park, CA (US)

(72) Inventors: Etay Gafni, Menlo Park, CA (US); Soren Harner, Palo Alto, CA (US)

(73) Assignee: LayerJot, Inc., Menlo Park, CA (US)

( * ) Notice: Subject to any disclaimer, the term of this patent is extended or adjusted under 35 U.S.C. 154(b) by 62 days.

(21) Appl. No.: 16/516,255

(22) Filed: Jul. 19, 2019

(65) Prior Publication Data

US 2021/0019573 A1    Jan. 21, 2021

(51) Int. Cl.
| | |
|---|---|
| G06K 9/00 | (2006.01) |
| G06K 9/62 | (2006.01) |
| G06F 8/33 | (2018.01) |
| G06T 19/00 | (2011.01) |
| G06K 9/32 | (2006.01) |

(52) U.S. Cl.
CPC ............. *G06K 9/6263* (2013.01); *G06F 8/33* (2013.01); *G06K 9/00671* (2013.01); *G06K 9/3241* (2013.01); *G06T 19/006* (2013.01)

(58) Field of Classification Search
CPC combination set(s) only.
See application file for complete search history.

(56) References Cited

U.S. PATENT DOCUMENTS

| | | | |
|---|---|---|---|
| 5,403,722 A | 4/1995 | Floeder | 435/39 |
| 8,098,936 B2 | 1/2012 | Guerzhoy | 382/181 |
| 8,595,331 B2 | 11/2013 | Henseler | 709/220 |
| 8,630,924 B2 | 1/2014 | Groenevelt | 705/28 |
| 9,160,931 B2 | 10/2015 | Robinson | H04N 5/23296 |
| 9,293,017 B2 | 3/2016 | McClure | 348/143 |
| 9,331,995 B2 | 3/2016 | Schneider | H04L 63/08 |
| 9,319,270 B2 | 4/2016 | Bestmann | H04N 41/08 |
| 9,426,212 B2 | 8/2016 | Sproule | H04L 67/10 |
| 9,779,111 B2 | 10/2017 | Larimore | G06F 17/30233 |
| 2012/0256954 A1* | 10/2012 | Soon-Shiong | G06F 16/9537 345/633 |
| 2013/0013683 A1* | 1/2013 | Elliott | H04L 51/10 709/204 |
| 2016/0104297 A1 | 4/2016 | Araujo dos Santos | G06T 7/20 |
| 2017/0206669 A1 | 7/2017 | Saleemi | G06T 7/285 |

(Continued)

*Primary Examiner* — Alex Kok S Liew
(74) *Attorney, Agent, or Firm* — Steven Stupp

(57) ABSTRACT

An electronic device that specifies or determines information associated with an application is described. During operation, the electronic device may identify one or more objects of interest in an acquired image. Then, the electronic device may determine or specify classifications (such as names) for the one or more objects of interest. Moreover, the electronic device may analyze a context of the one or more objects of interest in order to determine one or more inspection criteria. Once the one or more inspection criteria are determined, the electronic device may receive publishing information (such as designated recipients) and privacy settings (such as is the application private or public). Next, the electronic device may generate the application using the specified or determined information, and may publish or provide the application to one or more other electronic devices associated with the designated recipients using the publishing information and the privacy settings.

20 Claims, 14 Drawing Sheets

(56) References Cited

U.S. PATENT DOCUMENTS

| | | | |
|---|---|---|---|
| 2017/0244626 A1 | 8/2017 | Karren | H04L 43/14 |
| 2017/0262737 A1* | 9/2017 | Rabinovich | G06N 3/0454 |
| 2018/0329698 A1 | 11/2018 | Jawa | G06F 8/54 |

* cited by examiner

INTERACTIVE GENERATION AND PUBLICATION OF AN AUGMENTED-REALITY APPLICATION

BACKGROUND

Field

The described embodiments relate to techniques for interactively generating and publishing an augmented reality application. Notably, the described embodiments relate to techniques for interactively specifying objects of interest, classifications and context for an augmented reality application, and then distributing or publishing the augmented reality application for use on electronic devices.

Related Art

The capabilities and availability of electronic devices (such as cellular telephones, smartphones, tablets and, more generally, portable electronic devices) continue to increase. This has resulted in increasing interest in using electronic devices in a wide range of applications.

One class of applications that is of interest is augmented reality. Augmented reality is an interactive experience of a real-world environment in which objects that reside in the real-world are enhanced or supplemented by computer-generated information. For example, the computer-generated information may include perceptual information, such as visual, auditory, haptic, somatosensory or olfactory information. Alternatively or additionally, the computer-generated information may include descriptions or analysis of the objects in the real-world environment. The computer-generated information may be presented concurrently with a user's experience of the real-world environment and/or may be stored for subsequent use by the user.

However, it is often difficult for a typical individual to generate an augmented reality application for use with an electronic device. Notably, the typical individual often does not have detailed knowledge about the hardware and software capabilities of a given electronic device or how to program a robust augmented reality application that will execute in a current instance of operating system of the given electronic device. While information technology (IT) professionals have this knowledge, the relatively small number of IT professions in most organizations usually represents a bottleneck that delays or is an obstacle to the wide-spread use of augmented reality applications. Moreover, even when an organization is able to generate an augmented reality application, because the design and generation effort is usually centralized, it is typically difficult for users to dynamically adapt or modify an existing augmented reality application to match their needs or to incorporate real-world experience or learning associated with the existing augmented reality application.

SUMMARY

The described embodiments relate to an electronic device that specifies or determines information associated with an application. This electronic device includes: an image sensor that selectively acquires an image of an environment that comprises objects; a display; an interface circuit that communicates with a computer; a processor that executes the program instructions; and memory that stores the program instructions that, when executed by the processor, cause the electronic device to perform operations. During operation, the electronic device displays a current field of view of the image sensor. Then, in response to an image-acquisition input, the electronic device acquires the image using the image sensor. Moreover, the electronic device identifies and selects at least a subset of the objects based at least in part on analysis of the image. Next, the electronic device receives classifications for objects in the subset. Furthermore, the electronic device determines one or more inspection criteria associated with at least the subset of the objects based at least in part on analysis of a context of at least the subset of the objects in the image, where the one or more inspection criteria correspond to one or more attributes of the objects in the subset. Additionally, the electronic device receives publishing instructions that specify an audience and privacy settings for the application for use in conjunction with instances of a second electronic device, where the publishing instructions specify one or more recipients of the application, and the application is configured to perform analysis of one or more additional images based at least in part on the classifications and the one or more inspection criteria.

Note that the analysis of the image may include one of: providing the image intended for the computer (e.g., the image may be included in one or more packets or frames that designate the computer as a destination); and receiving object information associated with the computer (e.g., the object information may be received in one or more packets or frames that include information that indicates that they were transmitted by the computer), where the object information corresponds to the one or more objects; or determining the object information by performing image analysis.

Moreover, the electronic device may receive a revision to at least the subset of the objects, where the revision adds or removes an object from at least the subset of the objects.

Furthermore, the electronic device may provide recommended classifications for the objects in the subset, where the received classifications for the objects in the subset are based at least in part on the recommended classifications. For example, receiving the classifications may include receiving acceptance of the recommended classifications or receiving revisions to the recommended classifications.

Additionally, the classifications may include names for the objects in the subset.

In some embodiments, the one or more inspection criteria may be determined based at least in part on provided questions associated with the one or more attributes and received answers associated with the one or more attributes. Note that the received answers may include a revision to at least one of the one or more attributes.

Moreover, the analysis of the context may be performed on the electronic device and/or remotely by the computer.

Furthermore, the one or more attributes may include one or more of: a spatial arrangement of the objects in the subset, an order of the objects in the subset, a pattern corresponding to the objects in the subset, a number of the objects in the subset, one or more numerical values corresponding to the objects in the subset, or an orientation of the objects in the subset.

Additionally, the electronic device may receive a revision to the one or more attributes.

In some embodiments, the electronic device may provide, using the interface circuit, the publishing instructions and the privacy settings intended for the computer. Alternatively or additionally, the electronic device may: generate the application based at least in part on the classifications and the one or more inspection criteria; and provide, using the interface circuit, the application intended for the computer.

Another embodiment provides the computer

Another embodiment provides a computer-readable storage medium that stores program instructions for use with the electronic device or the computer. When executed by the electronic device of the computer, the program instructions cause the electronic device or the computer to perform at least some of the aforementioned operations.

Another embodiment provides a method, which may be performed by the electronic device or the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
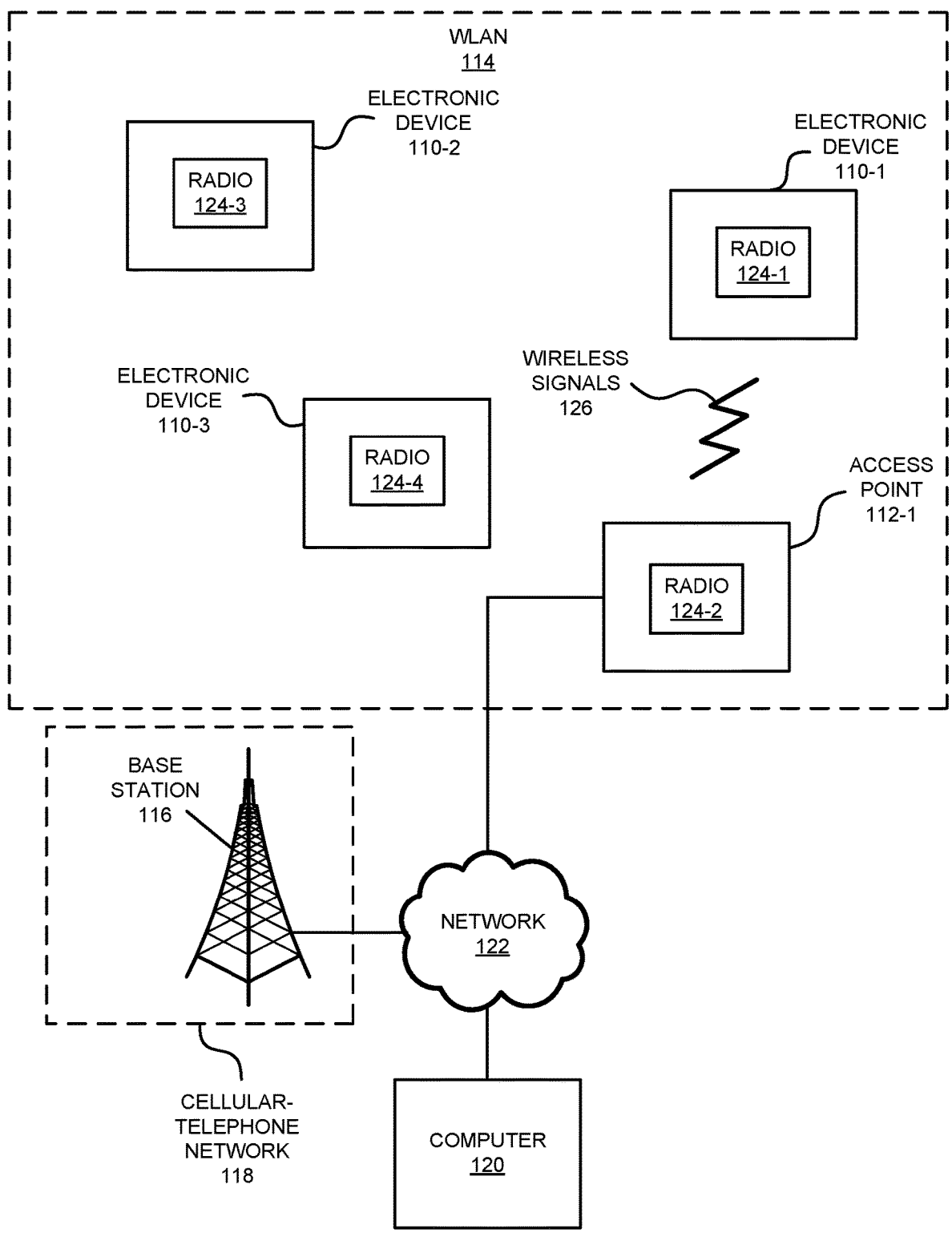
FIG. 1 is a block diagram illustrating communication among an electronic device and a computer in accordance with an embodiment of the present disclosure.

An electronic device that specifies or determines information associated with an application is described. The electronic device may acquire information that is used to generate and publish an application (such as an augmented reality application) for use on second electronic devices (such as cellular telephones, smartphones, tablets and, more generally, portable electronic devices). During the technique, an electronic device (such as a cellular telephone or a smartphone) and/or a remotely located computer may perform analysis of an image and may make recommendations about the information to a user, so that the user can approve or modify the recommendations. In this way, the information may be acquired based on an interaction with the user.

Notably, an electronic device may acquire an image. Then, the electronic device may identify one or more objects of interest in the image using image analysis, which may be performed locally on the electronic device and/or remotely by a computer. In addition, the electronic device may determine or specify classifications (such as names) for the one or more objects of interest. Moreover, the electronic device may analyze a context of the one or more objects of interest in order to determine one or more inspection criteria. For example, an inspection criterion may include "A yellow brick should occur 5 times." The user may approve or modify the one or more inspection criteria.

Once the one or more inspection criteria are determined, the electronic device may receive publishing information (such as specifying recipients) and privacy settings (such as is the application private or public) from the user. Using the specified or determined information, the electronic device may generate the application (either locally and remotely), and then the electronic device may publish the application using the publishing information and the privacy settings. Note that 'publishing' the application may include providing the application to electronic devices of designated recipients or providing configuration instructions to the electronic devices of the designated recipients. The configuration instructions may tailor or customize a generic application or container that is preinstalled on the electronic devices of the designated recipients, so that the generic application can perform the operations of the application.

Note that when executed by a given second electronic device of a designated recipient, the published application may analyze one or more additional images based on the classifications and the one or more inspection criteria and may generate a report. In some embodiments, the application may execute on the given second electronic device automatically, i.e., without human action.

In this way, the generating technique may allow a user to interactively specify the information needed to simply and efficiently generate and distribute an application that leverage image acquisition capabilities of the second electronic devices, image analysis and logical rules (the one or more inspection criteria). For example, the one or more inspection criteria may be implemented using one or more neural networks and/or one or more machine-learning models that analyze the one or more additional images. In some embodiments, feedback may be received or obtained, so that one or more neural networks and/or one or more machine-learning models (such as for classification or inspection) can be dynamically updated (i.e., the generating technique may include dynamic learning). Moreover, the application may be generated and distributed to a wide variety of second electronic devices that use different types or instances of operating systems.

Thus, the generating technique may allow a typical individual, who may not have detailed knowledge about the hardware and software capabilities of a given second electronic device or how to program a robust application that will execute in a current instance of an operating system of the given second electronic device, to generate and distribute the application. This disseminated capability may eliminate the bottleneck or obstacle posed by relying on IT professionals. Consequently, the generating technique may reduce the time, effort and expense needed to generate the application, and may allow the individual to dynamic adapt or modify a previous instance of the application to match their needs or to incorporate real-world experience or learning associated with the previous instance of the application. Therefore, the generating technique may facilitate more wide-spread use and flexible adaptation of applications, which may improve the user experience in both generating and using these applications.

In the discussion that follows, one or more electronic devices and the computer may communicate packets or frames in accordance with a wireless communication protocol, such as an Institute of Electrical and Electronics Engineers (IEEE) 802.11 standard (which is sometimes referred to as 'Wi-Fi'; from the Wi-Fi Alliance of Austin, Tex.), Bluetooth (from the Bluetooth Special Interest Group of Kirkland, Wash.), a cellular-telephone communication protocol (such as Long Term Evolution or LTE) and/or another type of wireless interface. In the discussion that follows, Wi-Fi or a cellular-telephone communication protocol are used as illustrative examples. However, a wide variety of communication protocols may be used.

Moreover, an access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more electronic devices 110 (such as a cellular telephone), an access point 112 in a wireless local area network (WLAN) 114, a base station 116 in a cellular-telephone network 118, and a computer 120 (or a group of computers). Notably, electronic devices 110 may communicate with access point 112 and/or base station 116 using wireless communication. Moreover, access point 112 and/or base station 116 may provide access to a network 122 (such as the Internet, a cable network, etc.) that is external to WLAN 114 or cellular-telephone network 114. Note that access point 112 may include a physical access point and/or a virtual access point that is implemented in software that executes in an operating system of an electronic device or a computer.

Access point 112 may communicate with network 122 and/or base station 116 may communicate with cellular-telephone network 118 and/or network 122 using wired communication, wireless communication or both. This wired or wireless communication may occur via an intra-net, a mesh network, point-to-point connections and/or the Internet and may use a network communication protocol, such as Ethernet. This network may include one or more routers and/or switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication with access point 112 also involves the use of dedicated connections, such as via a peer-to-peer (P2P) communication technique.

Figure 24:
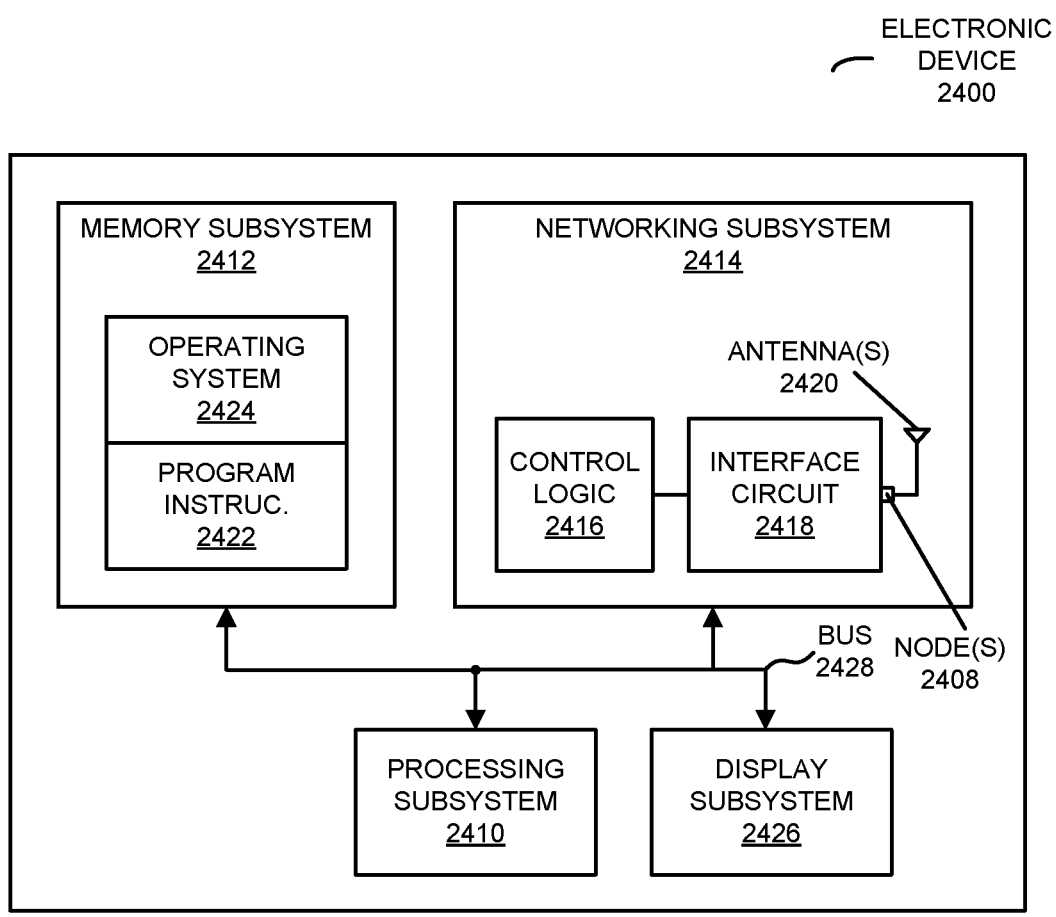
FIG. 24 is a block diagram illustrating an electronic device in accordance with an embodiment of the present disclosure.

As described further below with reference to FIG. 24, electronic devices 110, access point 112, base station 116 and/or computer 120 may include subsystems, such as a networking subsystem, a memory subsystem and a processor subsystem. In addition, electronic devices 110, access point 112 and/or base station 116 may include radios 124 in the networking subsystems. More generally, electronic devices 110 and access point 112 can include (or can be included within) any electronic devices with the networking subsystems that enable electronic devices 110 and access point 112 to communicate using wireless and/or wired communication. This wireless communication can comprise transmitting advertisements on wireless channels to enable electronic devices 110 and access point 112 to make initial contact or detect each other, followed by exchanging subsequent data/management packets or frames (such as association requests and responses) to establish a connection, configure security options (e.g., Internet Protocol Security), transmit and receive packets or frames via the connection, etc. Note that while instances of radios 124 are shown in electronic devices 110, access point 112 and base station 116, one or more of these instances may be different from the other instances of radios 124.

As can be seen in FIG. 1, wireless signals 126 (represented by a jagged line) are transmitted from radio 124-1 in electronic device 110-1. These wireless signals may be received by radio 124-2 in access point 112. Notably, electronic device 110-1 may transmit packets or frames. In turn, these packets or frames may be received by access point 112. Moreover, access point 112 may allow electronic device 110-1 to communicate with other electronic devices, computers and/or servers via network 122.

Note that the communication among electronic devices 110, access point 112 and/or base station 116 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in electronic devices 110, access point 112, and/or base station 116 may include: receiving signals (such as wireless signals 126) with the packet or frame; decoding/extracting the packet or frame from received wireless signals 126 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be difficult for a typical individual or an organization (such as a non-profit company, a for-profit company, a governmental organization) to quickly and flexibly generate an application for use with or execution on one or more of electronic devices 110. As described further below with reference to FIGS. 2-23, in order to address this problem, one of electronic devices 110 (such as electronic device 110-1) may perform the generating technique to allow a user of electronic device 110-1 to interactively specify specifies or determine information associated with an application. During the generating technique, electronic device 110-1 may execute a generating program or software that performs one or more operations.

Notably, during the generating technique, the user may acquire one or more images using electronic device 110-1. For example, the user may include one or more objects of interest in a current field of view of an image sensor (such as a CMOS or a CCD image sensor) in electronic device 110-1, and may activate a physical button or a virtual icon on a touch-sensitive display (and, more generally, may provide an image-acquisition input, which can include voice activation or gesture recognition) to acquire the one or more images. Note that the one or more images may include: video, complex information (phase and amplitude), depth information (such as a depth image), color (according to a color space, such as RGB, a color space extending outside the visual spectrum, etc.), an amount of light (such as from a light meter), etc.

Then, the one or more objects of interest in the one or more images may be identified using image analysis. For example, the one or more objects may be identified using a neural network (such as convolutional neural network) and/or a machine-learning model (such as a supervised-learning model or an unsupervised-learning model, e.g., support vector machines, classification and regression trees, logistic regression, LASSO, linear regression and/or another linear or nonlinear machine-learning model). Moreover, the machine-learning model may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), simultaneous locations and mapping (SLAM), etc. In some embodiments, the image analysis includes a Kalman or Bayes filter technique, which may build a state model over previous frames, such that the classification and analysis of objects in a scene is updated over multiple images in a sequence. SLAM may be used to localize the camera in the world. Thus, in the generating technique, SLAM may be generalized and combined with classification-based methods using, e.g., Bayesian inference. In these embodiments, the generating technique may use: an inertial measurement (e.g., from an accelerometer and/or a gyroscope) to help determine the scale of objects; and/or a light sensor to determine an illumination level to assist with light-balances or to determine a color or a type of material. Note that the image analysis may be performed locally on electronic device 110-1 (e.g., electronic device may identify the one or more objects) and/or remotely by computer 120 based on communication via network 122 (e.g., electronic device 110-1 may provide an image to computer 120 and may receive information that specifies the one or more objects or object information from the computer 120).

After the one or more objects are identified, the electronic device 110-1 may display or provide information that specifies the one or more objects (such as a border or a frame around an identified object) and the user may provide information to electronic device 110-1 that confirms and/or modifies the identified one or more objects (e.g., the user may activate a physical button or a virtual icon on a touch-sensitive display to select at least a subset of the one or more objects that are of interest). For example, the user may provide a revision to at least the subset of the objects that adds or removes an object from at least the subset of the objects.

Next, electronic device 110-1 may request that the user provide classifications (such as names, categories, colors, materials, heads or tails, a denomination or numerical value, shapes, topological relationships, e.g., a locked padlock, geometric arrangements, an open or closed state, ordering, etc.) associated with at least the subset of the one or more objects. For example, a name or category for a quarter may include a coin, a currency or an object; a shape may include a sphere, a cube, a prism, a cone, a disk, a square (or flat object), etc.; a color may include a solid color (such as blue, red, green, purple, etc.) or a multicolored pattern; a material may include metal, plastic, wood, etc.; relative information for an individual object may include, e.g., heads or tails, which is relative to the surface it lies on; relative information for multiple objects may include that the sphere is to the left of the cube, the quarter is in front of the nickel, the red Lego is above the blue Lego, a bicycle lock attaches a bicycle to a pole, etc.; states such as open or closed for scissors, clamps; a geometric arrangement of objects and orders may include buttons in a line, an l-shaped formation; a sequence of objects from left to right; the results of operations such as finding objects, counting objects, localizing the position of an object in a 3D coordinate system, etc.

In response, the user may provide the classifications for at least the subset of the one or more objects to electronic device 110-1. For example, the user may provide the classifications using a user interface (such as a keyboard, a touch pad, a touch-sensitive display, etc.) and/or a voice-recognition user interface. In general, the user may provide inputs to electronic device 110-1 during the generating technique using a human-electronic device interface.

In some embodiments, electronic device 110-1 may provide recommended classifications for the objects in the subset (such as using a set of predefined or predetermined classifications, i.e., classifications that electronic device 110-1 can recognize), and the received classifications for the objects in the subset may be based at least in part on the recommended classifications. Notably, the user may accept or revise the recommended classifications. Note that electronic device 110-1 (and/or computer 120) may determine the recommended classifications using the same or a second neural network and/or machine-learning model (such as a supervised-learning model or an unsupervised-learning model). In some embodiments, an object may be identified (and, thus, a recommended classification may be specified) using radio-frequency identification, a barcode, a QR code, a fiduciary markers, text or logos on packaging, etc.

In general, different scene analysis models may be used depending on the capabilities of electronic device 110-1 in order to tune and optimize a scene-analysis model to characteristics of the target hardware. This may include training smaller models for less powerful hardware, quantizing models, pruning models, etc., depending on the type of electronic device and its capabilities.

Moreover, one or more inspection criteria associated with at least the subset of the objects may be determined based at least in part on analysis of a context (or visual context) of at least the subset of the objects in the image. Note that the one or more inspection criteria may correspond to one or more attributes or characteristics of the objects in at least the subset, which correspond to the context. For example, the one or more attributes or the context may include one or more of: a spatial arrangement (or intra-relationships or interrelationships, i.e., between objects in an image or within an object) of the objects in the subset, an order of the objects in the subset, a pattern corresponding to the objects in the subset, a number of the objects in the subset, one or more numerical values corresponding to the objects in the subset, an orientation of the objects in the subset, a material of the objects in the subset (such as plastic or metal), a shape of the objects in the subset (such as a ball, a sphere, a cube, etc.), a value of the one or more objects in the subset, measurements relative to a physical or a virtual coordinate system, a temporal relationship among the objects in the subset, or states or actions associated with the objects in the subset. Thus, the one or more attributes may include a color and/or a number of the one or more objects, and the one or more inspection criteria may be, e.g., that "a yellow brick should occur 5 times." The user may approve or modify the one or more attributes and/or the one or more inspection criteria. More generally, the one or more inspection criteria may include business logic to apply to a given image, such as: patterns, colors, size, a shaped inspection region (e.g., a line, a box, an l-shaped region, etc.), a value (such as a monetary value, head or tails, a number on the surface of a die, etc.), etc.

In general, the analysis of the context, and thus the determination of the one or more inspection criteria, may be performed locally on electronic device 110-1 and/or remotely by computer 120 based on communication via network 122. Furthermore, electronic device 110-1 (and/or computer 120) may determine the one or more inspection criteria and/or the one or more attributes, and/or may perform the analysis of the context using the same or a third neural network and/or machine-learning model (such as a supervised-learning model or an unsupervised-learning model).

In some embodiments, the one or more inspection criteria may be determined based at least in part on questions associated with the one or more attributes that are provided by electronic device 110-1 to the user, and answers associated with the one or more attributes that are received from the user. Note that the received answers may include a revision to at least one of the one or more attributes that are determined by electronic device 110-1 and/or computer 120. For example, electronic device 110-1 may perform natural language processing and semantic parsing (and, more generally, semantic reasoning) to determine the one or more inspection criteria and/or the one or more attributes from the answers. Alternatively, as noted previously, in embodiments where electronic device 110-1 does not provide questions associated with the one or more attributes, electronic device 110-1 may receive a revision from the user to at least one of the one or more attributes and/or the one or more inspection criteria, which may have been determined by electronic device 110-1 and/or computer 120.

Additionally, the user may provide to electronic device 110-1 publishing instructions for an application that specify an audience or designated recipients and privacy settings for the application (such as whether the application private, e.g., restricted to particular designated recipients or recipients that have appropriate privileges, or public). Note that the application may be intended for use in conjunction with one or more instances of a second electronic device (such as electronic devices 110-2 and 110-3). Moreover, the publishing instructions may specify addresses of users of electronic devices 110-2 and 110-3 or of electronic devices 110-2 and 110-3 in WLAN 114, cellular-telephone network 116 or network 122, such as email addresses, telephone numbers, media access control (MAC) addresses, etc. As described further below, note that publishing the application may occur using a push and/or a pull technique. For example, the application may be pushed to electronic devices 110-2 and 110-3, which are associated with designated recipients. Alternatively, an email or a text message may be provided to a designated recipient with a link (such as a uniform resource locator or URL) or a QR code. When the designated recipient activates the link or scans the QR code, the application may be downloaded onto their associated electronic device. In some embodiments, such as when the application is public, users may access the application via a portal on a web page or website, and then may download and install it onto their electronic devices.

Using information that specifies the objects of interest, the classifications, the one or more inspection criteria, the publishing instructions and/or the privacy settings, the application may be generated and published. These operations may be performed locally and/or remotely. For example, electronic device 110-1 may automatically (i.e., without further user action) generate the application and may, via network 122, provide it to computer 120, so that computer 120 can distribute or provide the application, such as to the users of electronic devices 110-2 and 110-3. Alternatively, electronic device may provide information that specifies the objects of interest, the classifications, the one or more inspection criteria, the publishing instructions and/or the privacy settings to computer 120, via network 122, so that computer 120 can automatically generate and publish the application.

Note that the application may be a standalone executable that can be downloaded (e.g., via WLAN 114, cellular-telephone network 116 and/or network 122) and installed on a given second electronic device (such as electronic device 110-2). However, in some embodiments, the application may include configuration instructions for a preinstalled application or container on the given second electronic device. These configuration instructions may be provided to the given second electronic device, and may tailor or customize the preinstalled application or container, so that, when executed, it performs the operations associated with the application. In some embodiments, the application executes in an environment of a Web browser. For example, the application may be a Web browser plugin. Alternatively, in some embodiments, the application is, at least in part, implemented using a client-server architecture, such as in conjunction with computer 120.

When executed by the given second electronic device (such as when a user of the given second electronic device activates the application or selects the configuration instructions of the application in the preinstalled application or container), the application may perform analysis of one or more additional images based at least in part on the classifications and the one or more inspection criteria. Notably, the application may identify any instances of the one or more objects in the one or more additional images (e.g., using image analysis or deep learning), may perform or determine the one or more inspection criteria (such as object recognition, tagging or labeling and/or counting), and may display, store and/or provide a report summarizing the results. Once again, during execution of the application, one or more of the operations associated with the application may be performed locally on the given second electronic device and/or remotely on computer 120, via network 122. For example, image analysis of one or more additional images may be performed remotely by computer 120, the one or more inspection criteria may be assessed remotely by computer 120 and/or the report summarizing the results may be stored remotely by computer 120.

In some embodiments, one or more of the operations in the generating technique may leverage domain understanding or knowledge associated with a different application (in the same of a different market segment) that was previously generated. This may facilitate cross-domain understanding. For example, domain knowledge may be packaged in an ontology (e.g. represented as collection logical rules), so that it can be shared or reused by multiple applications. Moreover, one or more of the operations in the generating technique, such as business logic or the one or more inspection criteria, may be provided by a third party, which is different from the user or a provider of the generating technique.

In this way, the generating technique may allow the user to interactively specify the information needed to simply and efficiently generate and distribute the application. Moreover, the generating technique may allow the user to flexibly adapt or change an existing instance of an application, so that real-world experience and dynamic learning can be incorporated into the application. These capabilities may make allow the application to be generated and disseminated using less time, effort and expense, and this may expand the number of applications that are generated and used. Consequently, the generating technique may improve the user experience when generating and using the application.

Note that the application may be used in or relevant to a variety of fields or market segments, including: medicine or surgery, aviation, industrial maintenance, inspection, verification, car maintenance, defense or military, remote experts, customer relationship management, retail, sales, etc.

Figure 2:
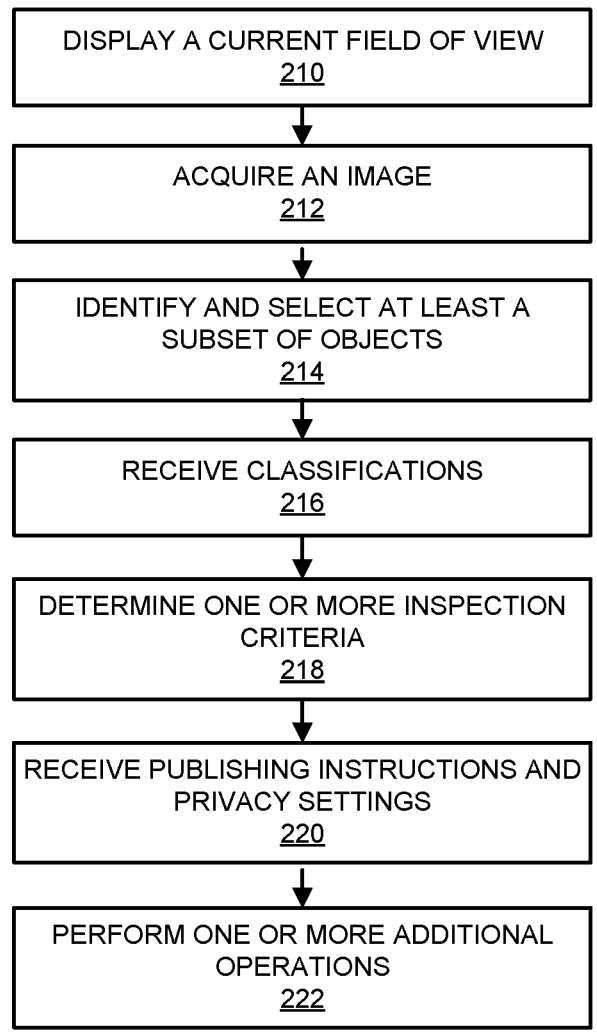
FIG. 2 is a flow diagram illustrating a method for specifying or determining information associated with an application using an electronic device in FIG. 1 in accordance with an embodiment of the present disclosure.

We now describe embodiments of the method. FIG. 2 presents a flow diagram illustrating an example of a method 200 for specifying or determining information associated with an application, which may be performed by an electronic device (such as electronic device 110-1 in FIG. 1).

During operation, the electronic device may optionally display a current field of view (operation 210) of an image sensor. Then, in response to an image-acquisition input, the electronic device may acquire an image (operation 212) using the image sensor. Moreover, the electronic device may identify and select at least a subset of the objects (operation 214) based at least in part on analysis of the image. Next, the electronic device may receive classifications (operation 216) for objects in the subset, such as names for the objects or information that specifies types of objects.

Furthermore, the electronic device may determine one or more inspection criteria (operation 218) associated with at least the subset of the objects based at least in part on analysis of a context of at least the subset of the objects in the image, where the one or more inspection criteria correspond to one or more attributes of the objects in the subset. For example, the one or more attributes or the context may include one or more of: a spatial arrangement or interrelationship of the objects in the subset, an order of the objects in the subset, a pattern corresponding to the objects in the subset, a number of the objects in the subset, one or more numerical values corresponding to the objects in the subset, an orientation of the objects in the subset, a material of the objects in the subset, a shape of the objects in the subset, a value of the one or more objects in the subset, measurements relative to a physical or a virtual coordinate system, or states or actions associated with the objects in the subset.

Additionally, the electronic device may receive publishing instructions (operation 220) that specify an audience and privacy settings (operation 220) for the application for use in conjunction with instances of a second electronic device, where the publishing instructions specify one or more recipients of the application, and the application is configured to perform analysis of one or more additional images based at least in part on the classifications and the one or more inspection criteria.

In some embodiments, the electronic device optionally performs one or more additional operations (operation 222). For example, the analysis of the image may include: providing the image intended for a computer; and receiving object information associated with the computer, where the object information corresponds to the one or more objects. Alternatively or additionally, the analysis of the image may include determining the object information by performing image analysis.

Moreover, the electronic device may receive a revision to at least the subset of the objects, where the revision adds or removes an object from at least the subset of the objects.

Furthermore, the electronic device may provide recommended classifications for the objects in the subset, where the received classifications for the objects in the subset are based at least in part on the recommended classifications. For example, receiving the classifications may include receiving acceptance of the recommended classifications or receiving revisions to the recommended classifications.

Additionally, the one or more inspection criteria may be determined based at least in part on provided questions associated with the one or more attributes and received answers associated with the one or more attributes. Note that the received answers may include a revision to at least one of the one or more attributes.

In some embodiments, the analysis of the context may be performed on the electronic device and/or remotely by the computer.

Moreover, the electronic device may provide, using an interface circuit, the publishing instructions and the privacy settings intended for the computer. Alternatively or additionally, the electronic device may: generate the application based at least in part on the classifications and the one or more inspection criteria; and provide, using the interface circuit, the application intended for the computer.

In some embodiments of method 200, there may be additional or fewer operations. Furthermore, the order of the operations may be changed, and/or two or more operations may be combined into a single operation. While some of the preceding embodiments may involve feedback or information received from a user, in other embodiments one or more of these operations may be automated, i.e., performed without human action.

Figure 3:
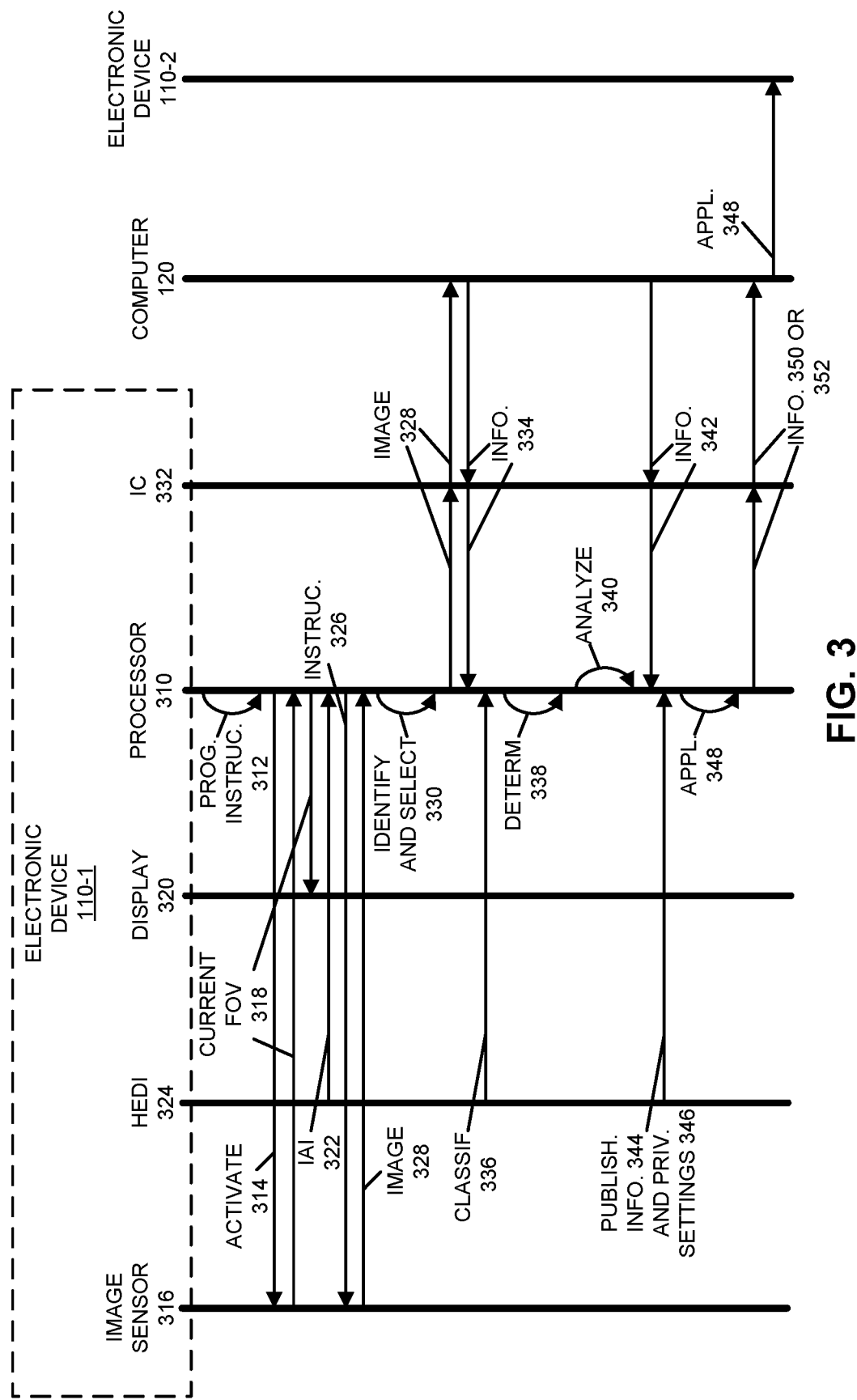
FIG. 3 is a drawing illustrating communication among electronic devices and the computer in FIG. 1 in accordance with an embodiment of the present disclosure.

FIG. 3 presents a drawing illustrating an example of communication among electronic device 110-1, computer 120 and electronic device 110-2. During operation, processor 310 in electronic device 110-1 may execute program instructions 312 in a generating program. In response, processor 310 may activate 314 an image sensor 316 in electronic device 110-1 and may display a current field of view (FOV) 318 on display 320 in electronic device 110-1.

Then, in response to an image-acquisition input (IAD 322, which may be received from a user via a human-electronic device interface (HEDI) 324 in electronic device 110-1, processor 310 may instruct 326 image sensor 316 to acquire an image 328. Moreover, processor 310 may identify and select 330 at least a subset of objects based at least in part on analysis of image 328. The identification and selection may be performed by processor 310. Alternatively or additionally, processor 310 may provide image 328 to computer 120 using interface circuit (IC) 332 in electronic device 110-1. In response, computer 120 may perform the identification and may provide information 334 that specifies at least the subset of the objects to interface circuit 330, which then provides information 334 to processor 310.

Next, human-electronic device interface 324 may receive classification 336 for the objects in the subset, which are forwarded to processor 310. Alternatively or additionally, processor 310 may determine 338 classifications 336.

Furthermore, processor 310 may analyze 340 image 328 to determine a context of at least the subset of the objects, one or more attributes of at least the subset of the objects and/or one or more inspection criteria. The analysis may be performed by processor 310. Alternatively or additionally, computer 120 may analyze image 328 and may provide information 342 to interface circuit 332 (and, thus, processor 310) that specifies the context of at least the subset of the objects, the one or more attributes of at least the subset of the objects and/or the one or more inspection criteria.

Additionally, human-electronic device interface 324 may receive publishing instructions 344 that specify an audience and privacy settings 346 for an application, which are provided to processor 310. Processor 310 may generate application 348 and then may provide information 350 that includes application 348, publishing instructions 344 and privacy settings 346 to computer 120 using interface circuit 332. Alternatively or additionally, processor 310 may provide information 352 that specifies at least the subset of the objects, the classifications, the one or more attributes, the one or more inspection criteria, publishing instructions 344 and privacy settings 346 to computer 120 using interface circuit 332. In response, computer may use information 352 to generate application 348.

Subsequently, computer 120 may provide application 348 to electronic device 110-2 based at least in part on publishing instructions 344 and privacy settings 346. When executed on electronic device 110-2, application 348 may perform analysis of one or more additional images (which are acquired by a second user of electronic device 110-2) based at least in part on the classifications and the one or more inspection criteria.

While FIG. 3 illustrate communication between components using unidirectional or bidirectional communication with lines having single arrows or double arrows, in general the communication in a given operation in this figure may involve unidirectional or bidirectional communication.

Figure 4:
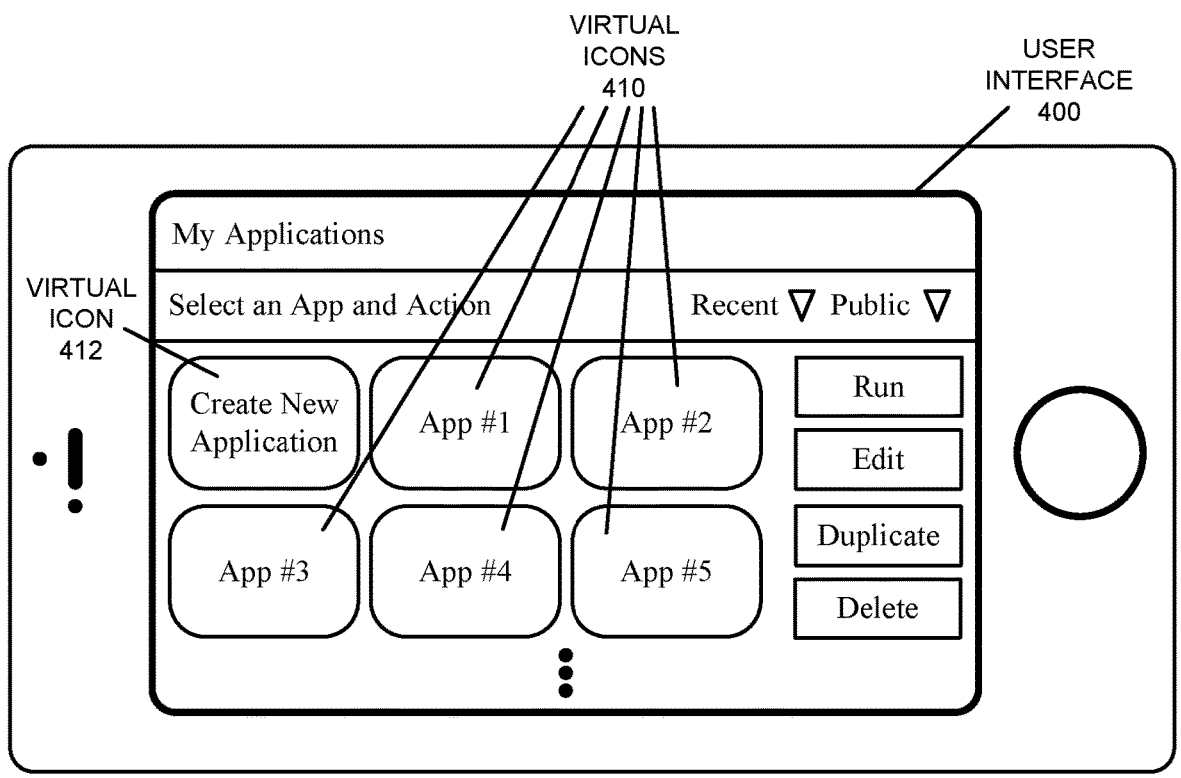
FIG. 4 is a drawing illustrating a user interface for use with an electronic device in FIG. 1 in accordance with an embodiment of the present disclosure.

We now describe embodiments of a user interface in a generating program. FIG. 4 presents a drawing illustrating a user interface 400 for use with electronic device 110-1 in FIG. 1 during the generating technique. User interface 400 may display virtual icons 410 for existing applications and a virtual icon 412 for creating a new application. When a user activates virtual icon 412 (such as by touching and releasing or breaking contact with a touch-sensitive display that display user interface 400 within a strike area associated with virtual icon 412), a generating program may be launched on electronic device 110-1.

Figure 5:
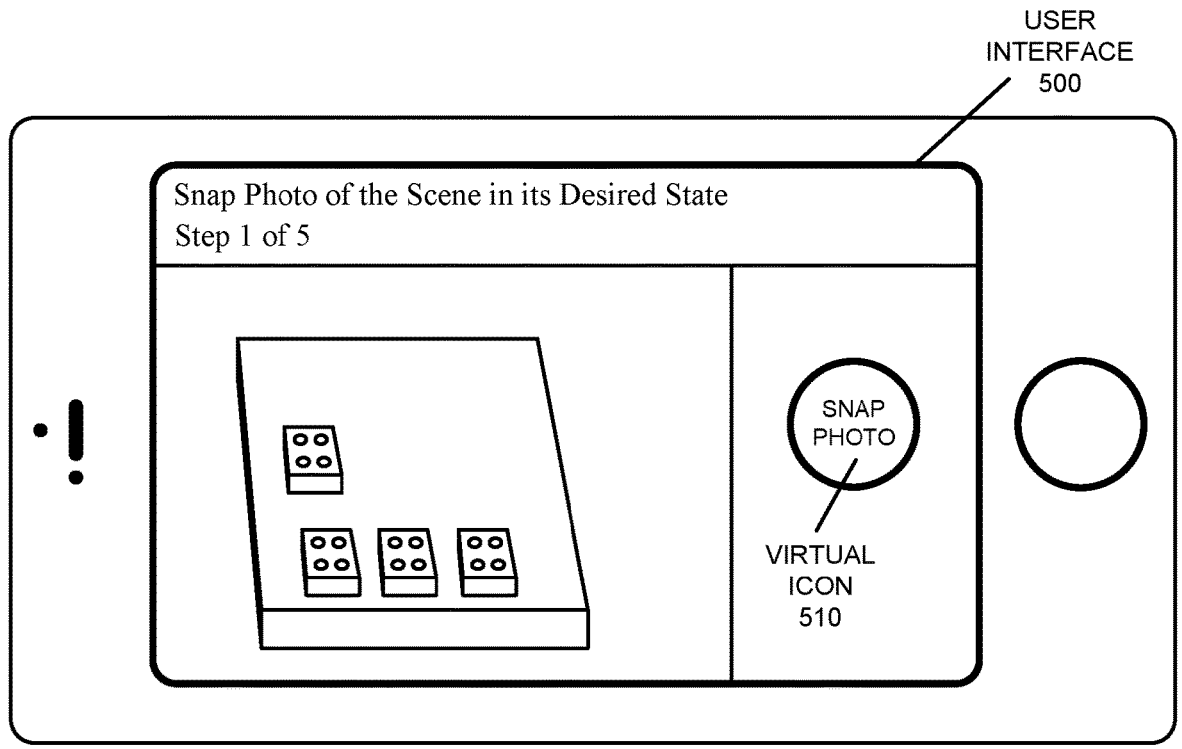
FIG. 5 is a drawing illustrating a user interface for use with an electronic device in FIG. 1 in accordance with an embodiment of the present disclosure.

As shown in FIG. 5, which presents a drawing illustrating a user interface 500 for use with electronic device 110-1 in FIG. 1 during the generating technique, the generating program may activate an image sensor in electronic device 110-1 and may display a current field of view. Moreover, the user may be prompted to position one or more objects of interest in the current field of view and to acquire at least an image of the scene or environment with the one or more objects of interests by activating a virtual icon 510 entitled 'snap photo' (which is an example of an image-acquisition input).

Figure 6:
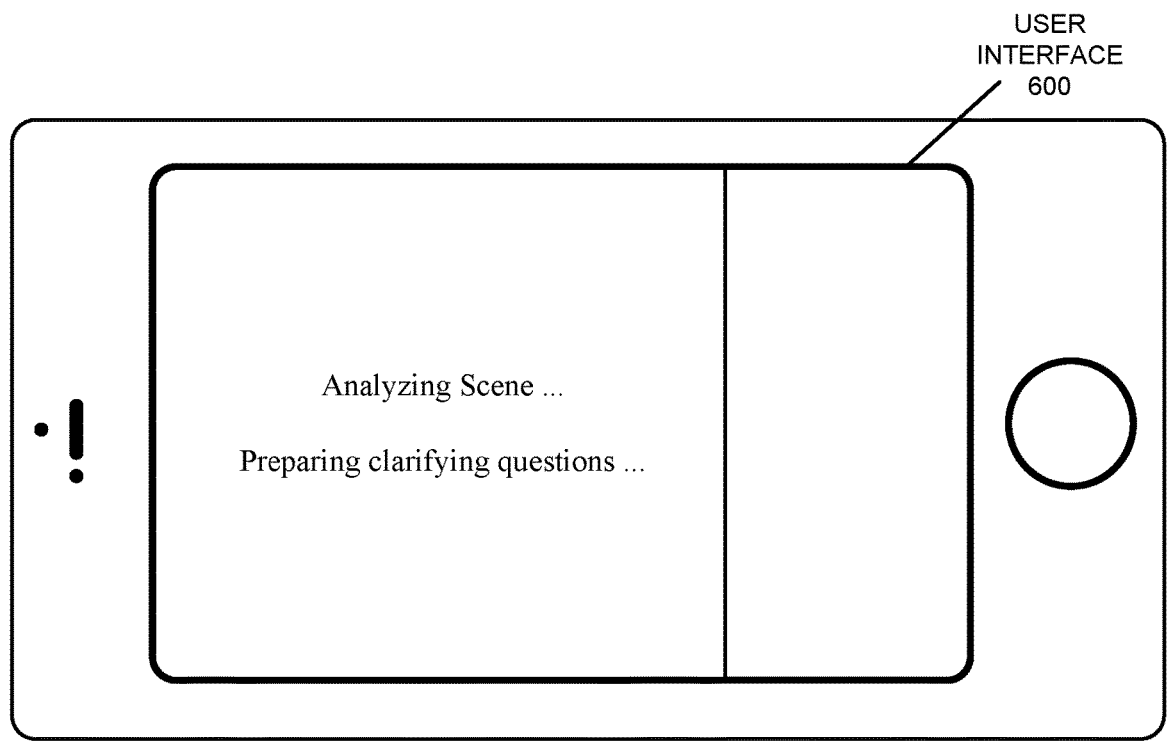
FIG. 6 is a drawing illustrating a user interface for use with an electronic device in FIG. 1 in accordance with an embodiment of the present disclosure.

Then, as shown in FIG. 6, which presents a drawing illustrating a user interface 600 for use with electronic device 110-1 in FIG. 1 during the generating technique, electronic device 110-1 (and/or computer 120) may analyze the acquired image to identify the one or more objects and may prepare questions to request user input to clarify the identified one or more objects and to select or facilitate selection of the one or more objects that are of interest.

Figure 7:
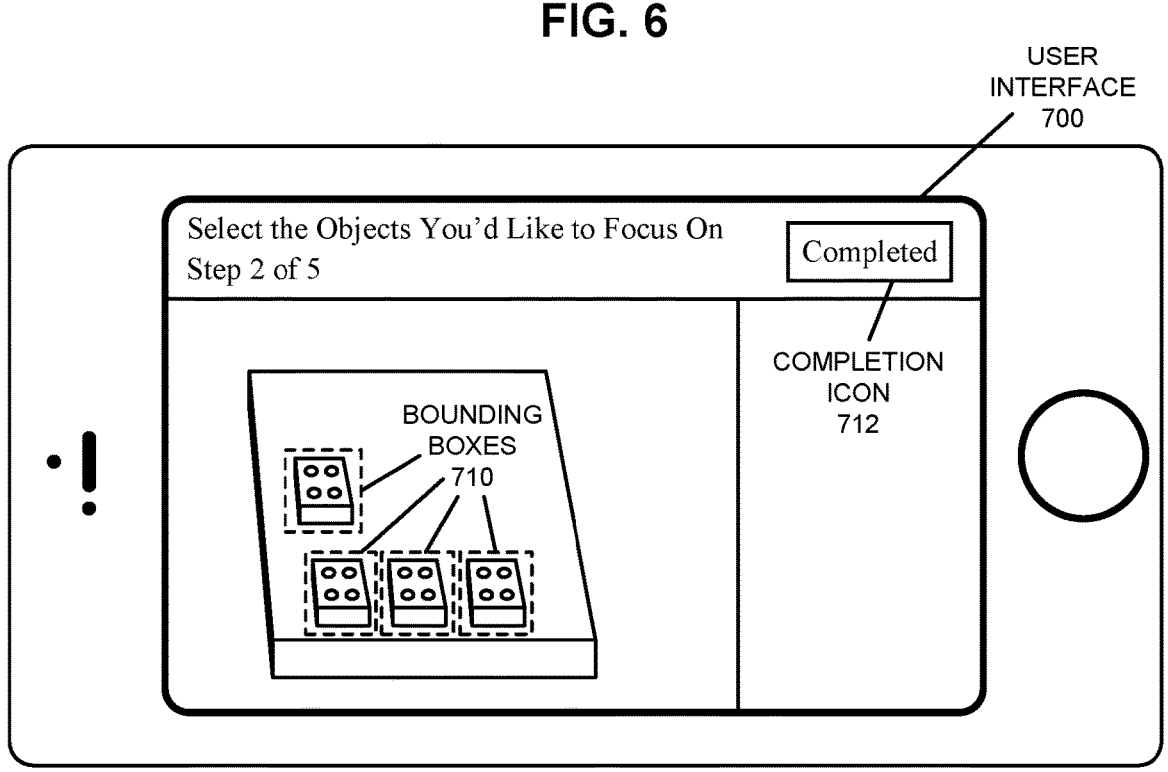
FIG. 7 is a drawing illustrating a user interface for use with an electronic device in FIG. 1 in accordance with an embodiment of the present disclosure.
Figure 8:
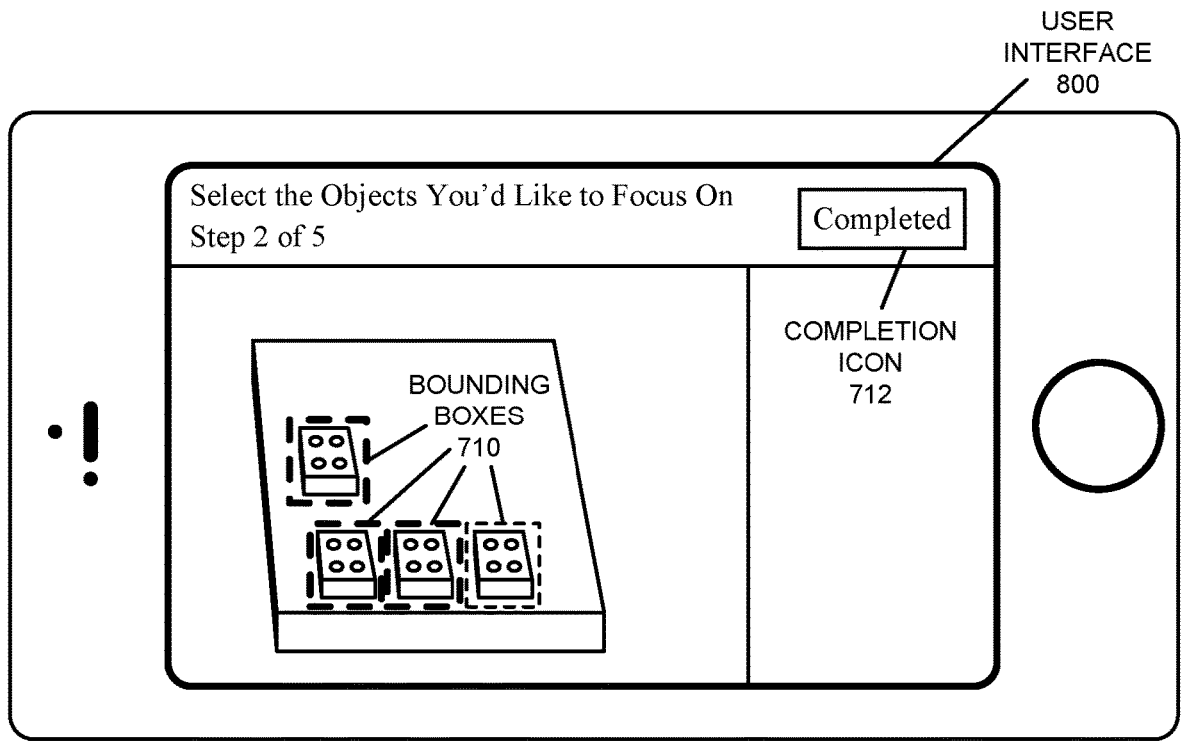
FIG. 8 is a drawing illustrating a user interface for use with an electronic device in FIG. 1 in accordance with an embodiment of the present disclosure.

This is shown in FIGS. 7 and 8, which present drawings illustrating user interfaces 700 and 800 for use with electronic device 110-1 in FIG. 1 during the generating technique. Notably, electronic device 110-1 may present one or more objects that were automatically identified with bounding boxes 710 around the one or more objects. The user may select at least a subset of the one or more objects that are of interest by making contact with the touch-sensitive display within a bounding box of a given object (which may select the given object). In response, the three selected bounding boxes 810 may change color (which is indicated by the bold lines in FIG. 8). In some embodiments, the user may add to the identified objects by providing another bounding box and/or may change a shape or reposition one or more of the bounding boxes 710. For example, the user may provide a bounding box around a given object by 'drawing' the bounding box with their finger on the touch-sensitive display (such as by making contact with the touch-sensitive display and tracing the bounding box shape around the given object). Similarly, the user may change the shape or reposition a given bounding box by touching and maintaining contact with the touch-sensitive display while moving their finger, which may drag a side of the given bounding box or the entire bounding box to a new position. When the user is finished selecting at least the subset of the one or more objects that are of interest, the user may activate a selection completion icon 712.

Figure 9:
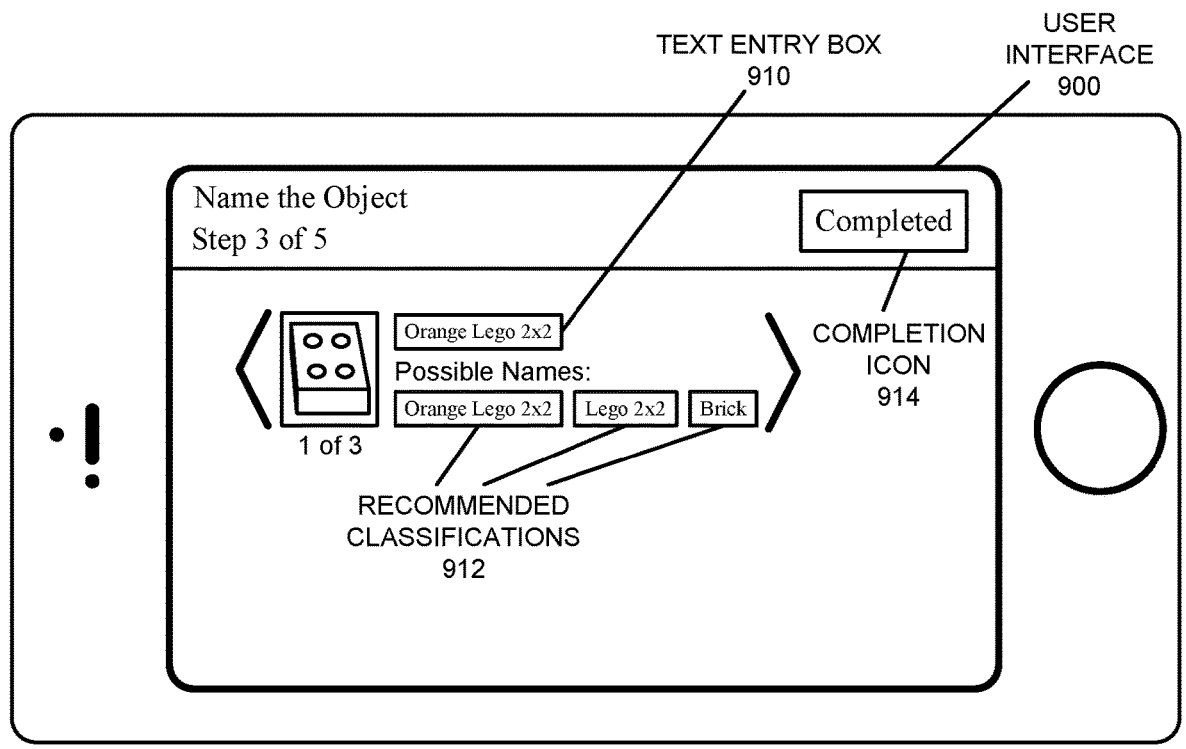
FIG. 9 is a drawing illustrating a user interface for use with an electronic device in FIG. 1 in accordance with an embodiment of the present disclosure.
Figure 10:
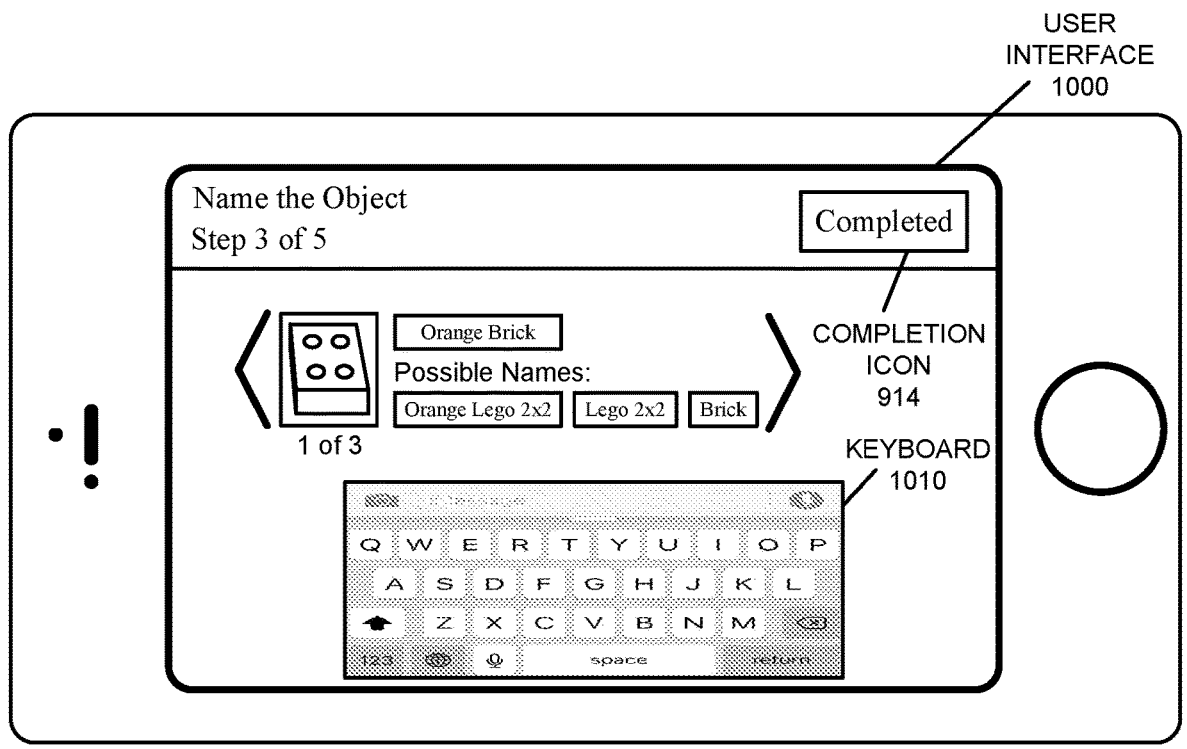
FIG. 10 is a drawing illustrating a user interface for use with an electronic device in FIG. 1 in accordance with an embodiment of the present disclosure.
Figure 11:
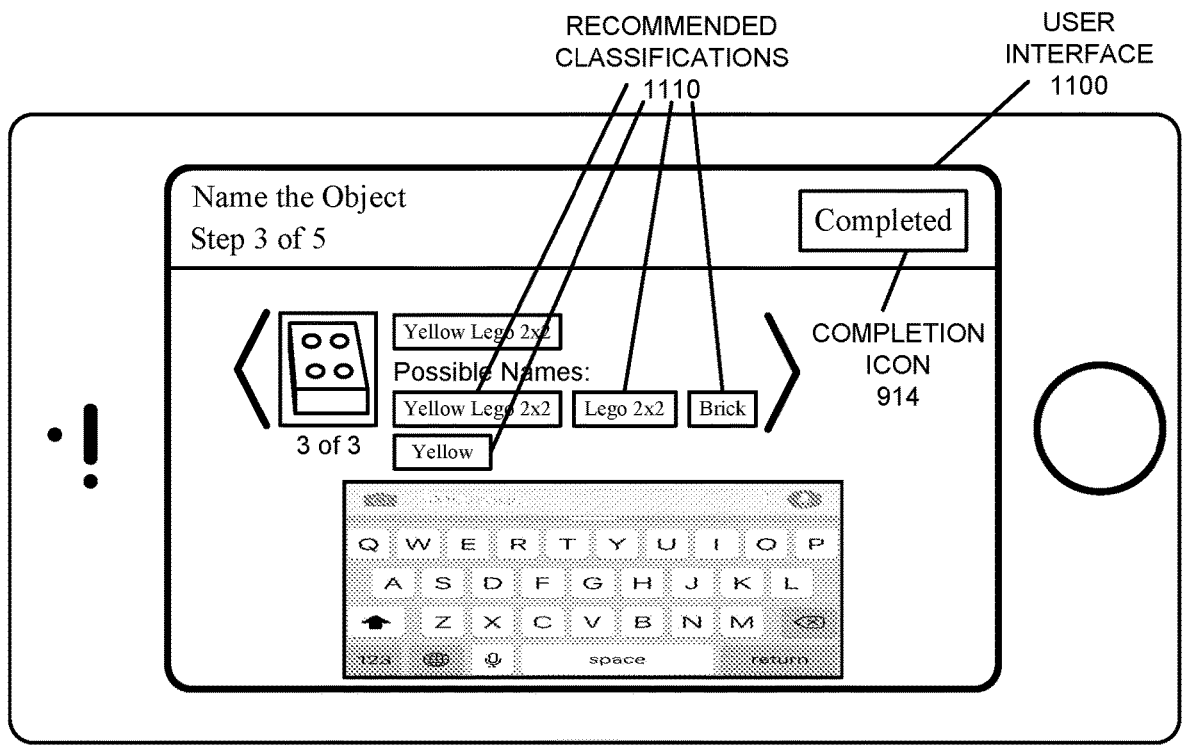
FIG. 11 is a drawing illustrating a user interface for use with an electronic device in FIG. 1 in accordance with an embodiment of the present disclosure.

Next, as shown in FIGS. 9-11, which present drawings illustrating user interfaces 900, 1000 and 1100 for use with electronic device 110-1 in FIG. 1 during the generating technique, the user may be prompted to provide classifications for at least the subset of the one or more objects that are of interest. For example, the user may type in a classification (such as a name) for a given object using a text-entry box 910 and a keyboard 1010. Note that electronic device 110-1 may present recommended classifications 912 and 1110, which are automatically determined by electronic 110-1 (and/or computer 120). A recommended classification may be selected by the user by making contact with the touch-sensitive display within a strike area corresponding to the recommended classification. When the user is finished providing a classification for the given object, the user may activate a naming completion icon 914.

Figure 12:
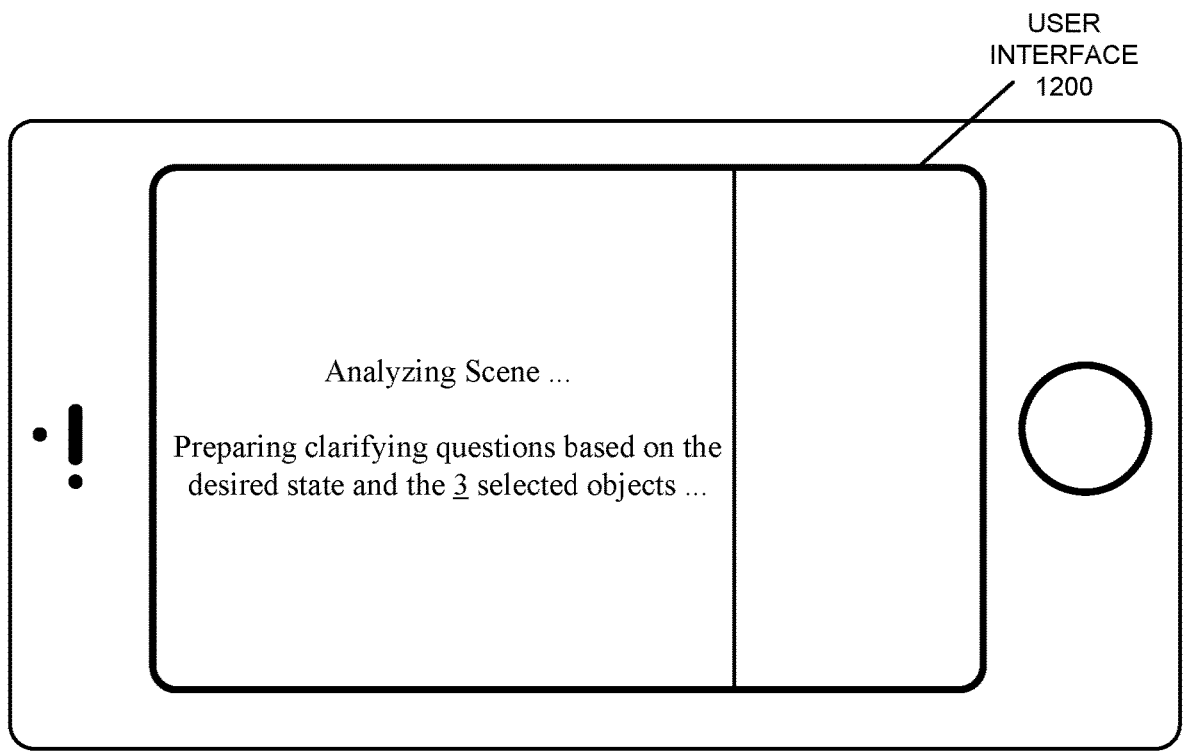
FIG. 12 is a drawing illustrating a user interface for use with an electronic device in FIG. 1 in accordance with an embodiment of the present disclosure.

Moreover, as shown in FIG. 12, presents a drawing illustrating a user interface 1200 for use with electronic device 110-1 in FIG. 1 during the generating technique, electronic device 110-1 (and/or computer 120) may perform semantic analysis or reasoning based at least in part on at least the subset of the one or more objects that are of interest, the associated classifications (which, at least in part, provide object descriptions), one or more attributes of at least the subset of the one or more objects that are of interest, and/or a context of at least the subset of the one or more objects that are of interest. For example, the one or more attributes and/or the context may be determined by electronic device 110-1 (and/or computer 120) using natural language processing and/or semantic parsing of the classifications, and/or image analysis of the acquired image (which may determine a shape, a feature count, an orientations, a pattern, a spatial arrangement, state information, etc.). The semantic reasoning may define logic relationships (which are sometimes referred to as 'business logic' or 'one or more inspection criteria') that will be used by the application to assess the one or more additional images.

In some embodiments, the one or more inspection criteria may be determined using logic programming (such as prolog), which can be used to determine whether a statement is true using backward and forward flows to implement inductive logic or a probabilistic inference. Notably, the inspection logic may include a declarative rule-bases system based on logic. This logic may be written in Prolog, and may use a unification technique to find solutions (such as specific bindings from facts derived from an image to variables in the clauses). An inspection criterion, such as an occurrence of a pattern, a formation, a count, an attribute match, an order, etc. may be expressed in logical rules, which may be provided in a domain ontology. These rules may be provided a priori or learned from examples, e.g. using inductive rule learning or differential inductive rule learning. In addition, semantic reasoning may be used to capture inspection criteria, which may be formulated as clauses. Note that the one or more inspection criteria or logic may also have both spatial and temporal relationships, e.g., a sphere that was to the left of a cube may now be in front of the cube.

In this way, electronic device 110-1 (and/or computer 120) may determine the most probable logical description of a state of the acquired image, which can define or specify the one or more inspection criteria.

Figure 13:
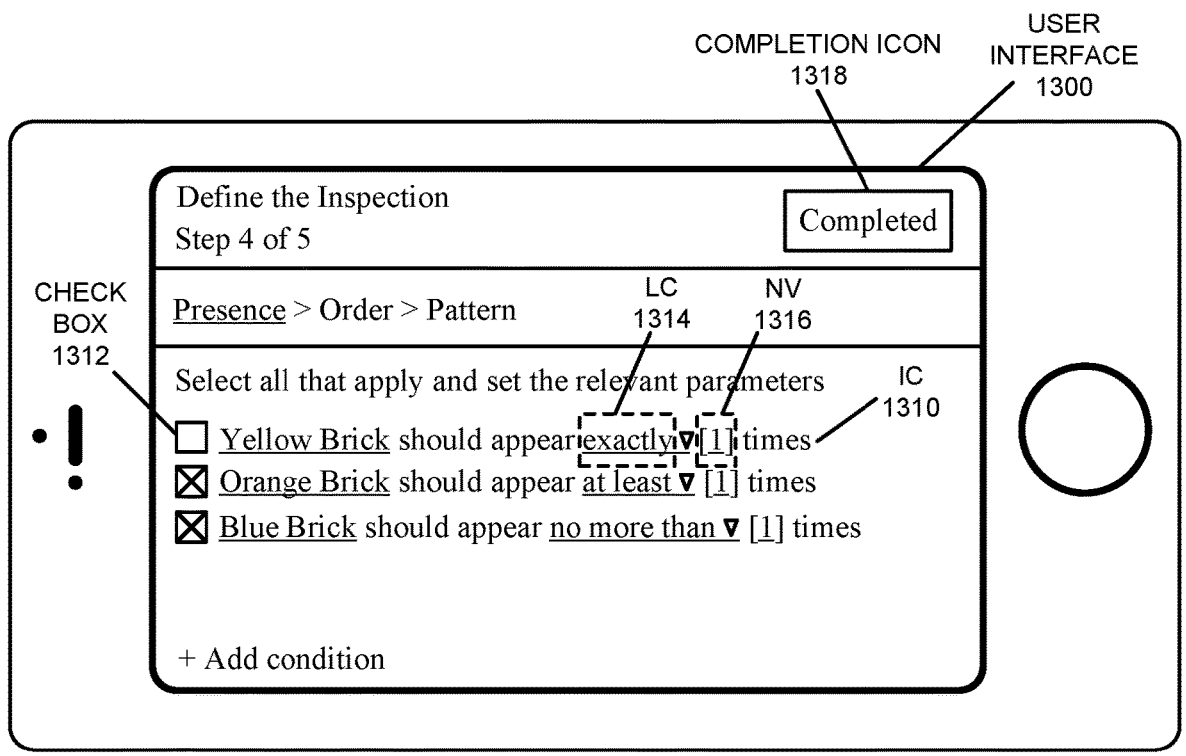
FIG. 13 is a drawing illustrating a user interface for use with an electronic device in FIG. 1 in accordance with an embodiment of the present disclosure.
Figure 14:
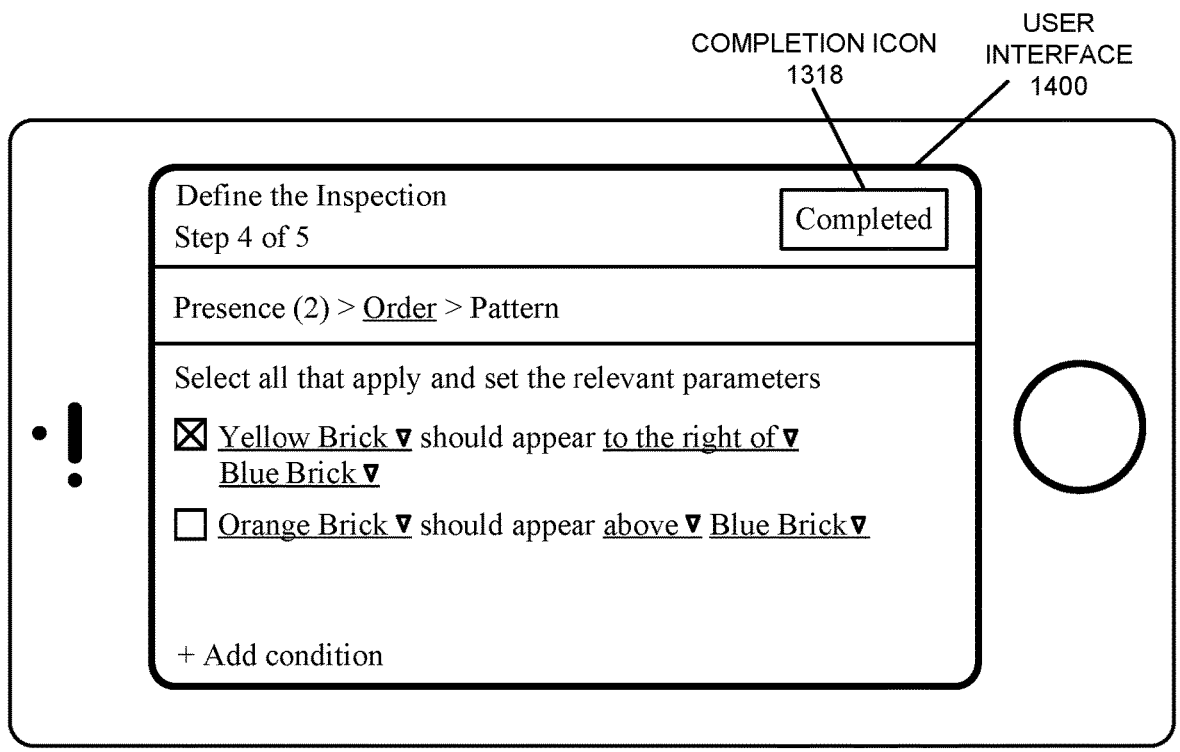
FIG. 14 is a drawing illustrating a user interface for use with an electronic device in FIG. 1 in accordance with an embodiment of the present disclosure.
Figure 15:
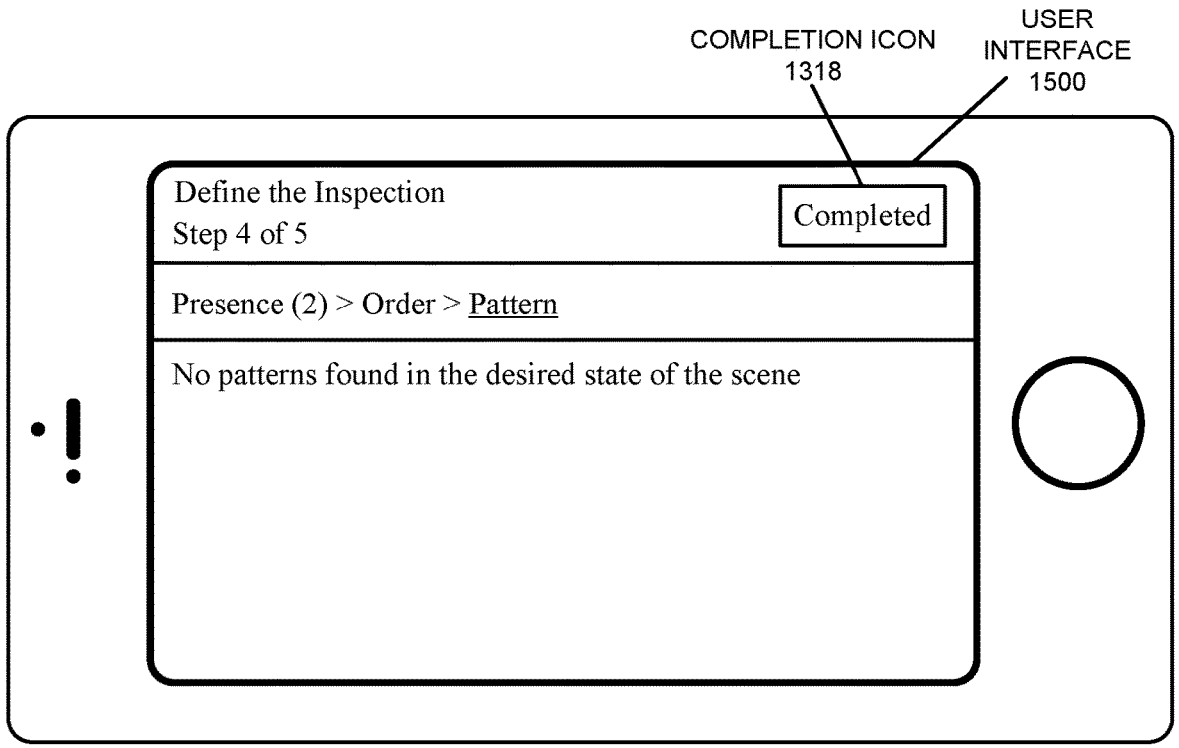
FIG. 15 is a drawing illustrating a user interface for use with an electronic device in FIG. 1 in accordance with an embodiment of the present disclosure.
Figure 16:
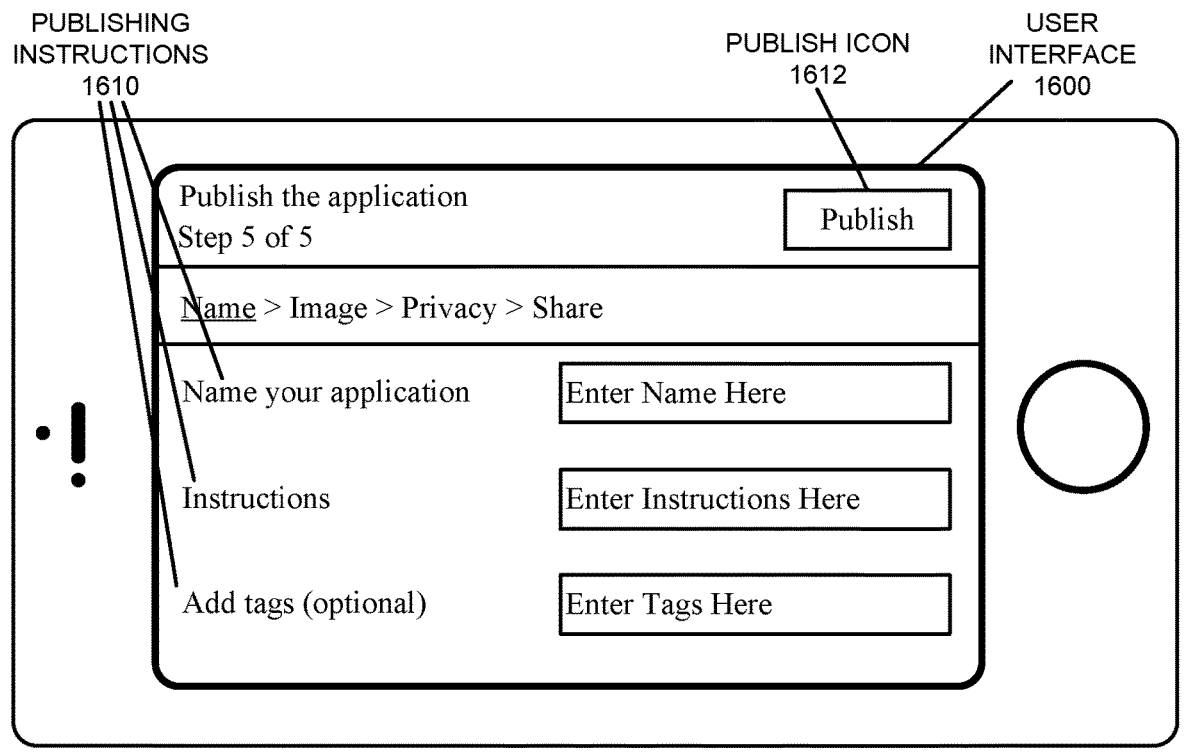
FIG. 16 is a drawing illustrating a user interface for use with an electronic device in FIG. 1 in accordance with an embodiment of the present disclosure.
Figure 17:
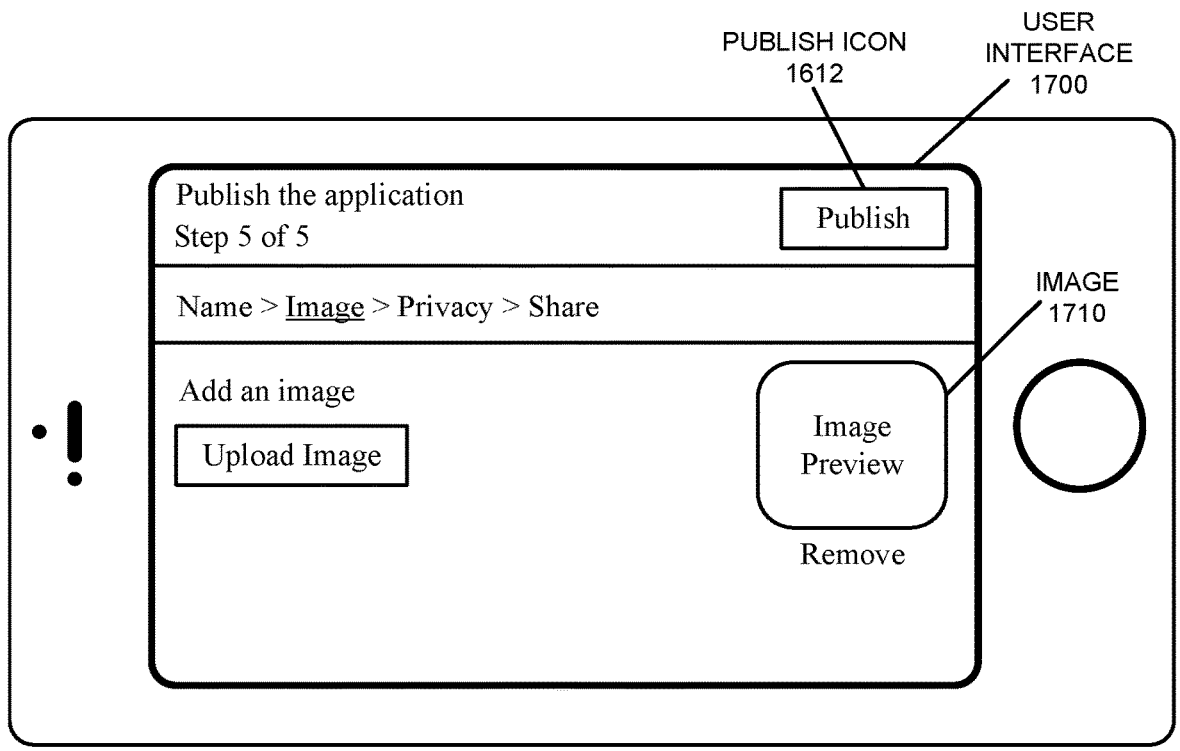
FIG. 17 is a drawing illustrating a user interface for use with an electronic device in FIG. 1 in accordance with an embodiment of the present disclosure.
Figure 18:
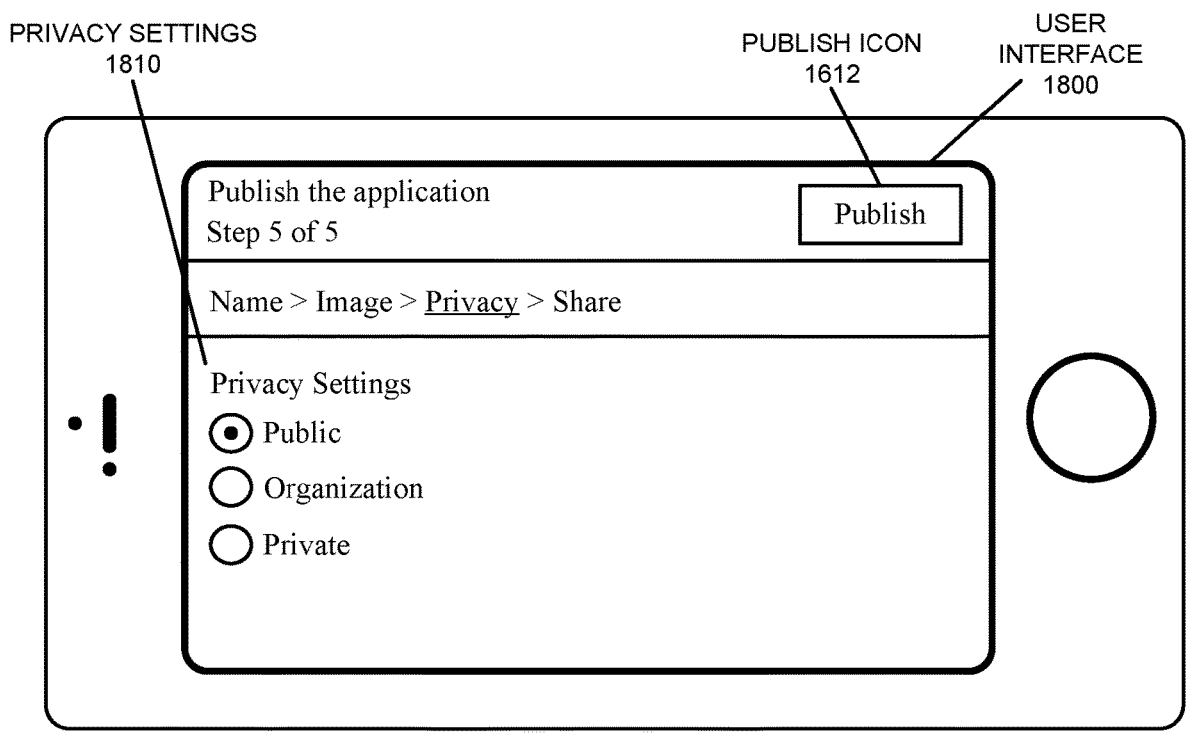
FIG. 18 is a drawing illustrating a user interface for use with an electronic device in FIG. 1 in accordance with an embodiment of the present disclosure.
Figure 19:
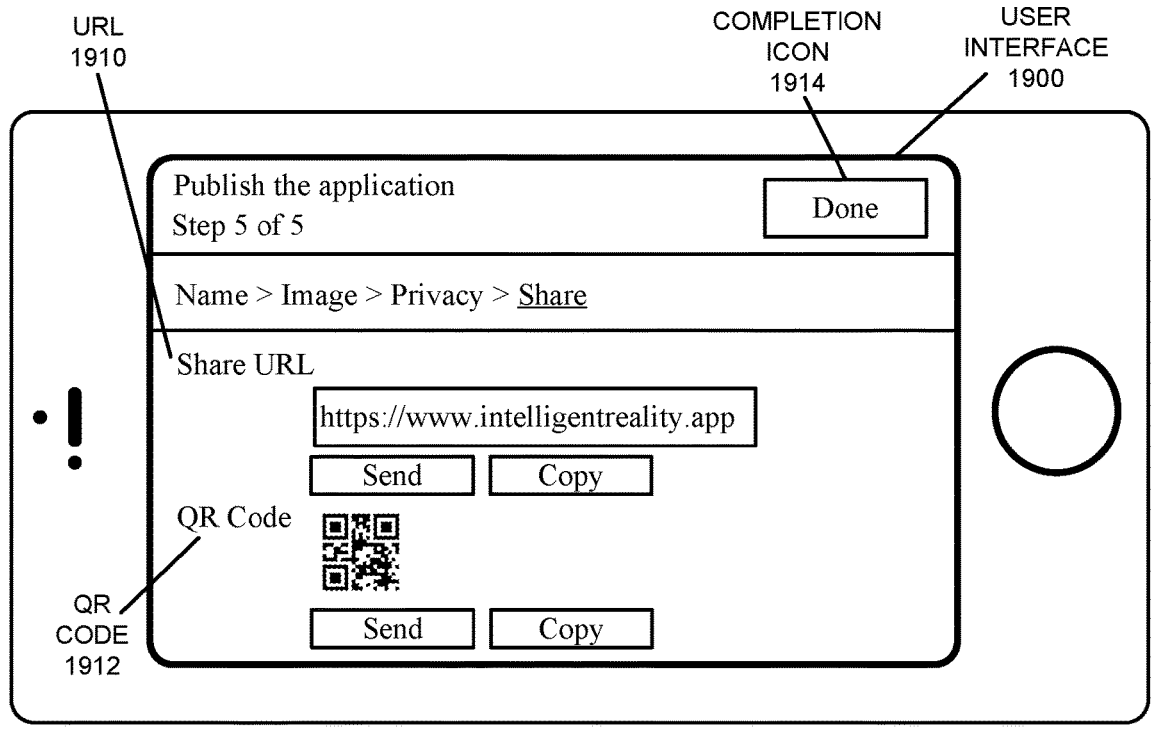
FIG. 19 is a drawing illustrating a user interface for use with an electronic device in FIG. 1 in accordance with an embodiment of the present disclosure.

Furthermore, electronic device 110-1 may ask the user for feedback on the determined one or more inspection criteria (which are, in essence, recommended inspection criteria). For example, the user may be asked to confirm or accept a recommended inspection criterion, or to modify or change it. This is shown in FIGS. 13-15, which present drawings illustrating user interfaces 1300, 1400 and 1500 for use with electronic device 110-1 in FIG. 1 during the generating technique. Notably, using user interface 1300, the user may select check boxes (such as check box 1312) to approve or remove one or more inspection criteria (such as inspection criterion or IC 1310), and may modify logical criteria (such as logical criterion or LC 1314), e.g., using a pull-down menu of alternative logical criteria, and/or numerical values (such as numerical value or NV 1316), e.g., by entering a different numerical value, in the one or more inspection criteria. Then, using user interfaces 1400 and 1500, respectively, the user may select an order and a pattern. When the user is finished providing the feedback on the one or more inspection criteria, the user may activate a completion icon 1318.

As shown in FIGS. 16-19, which present drawings illustrating user interfaces 1600, 1700, 1800 and 1900 for use with electronic device 110-1 in FIG. 1 during the generating technique, the user may provide publishing instructions 1610 for the application (such as information specifying designated recipients or an audience for the application), an optional image 1710 or icon for or associated the application and privacy settings 1810 for the application (such as public, within an organization, or private, which may restrict who can access and use the application). For example, the information provided by the user may include: a user definition or name for the application, output storage options for the application (such as JSON, XML, etc.), etc. When the user is finished providing this information, the user may publish the application by activating a publish icon 1612. In response, the user may be prompted to publish or distribute the application by providing a URL 1910 or a QR code 1912. Alternatively, the application may be published using a push technique. Next, the user may activate a 'done' or completion icon 1914.

Figure 20:
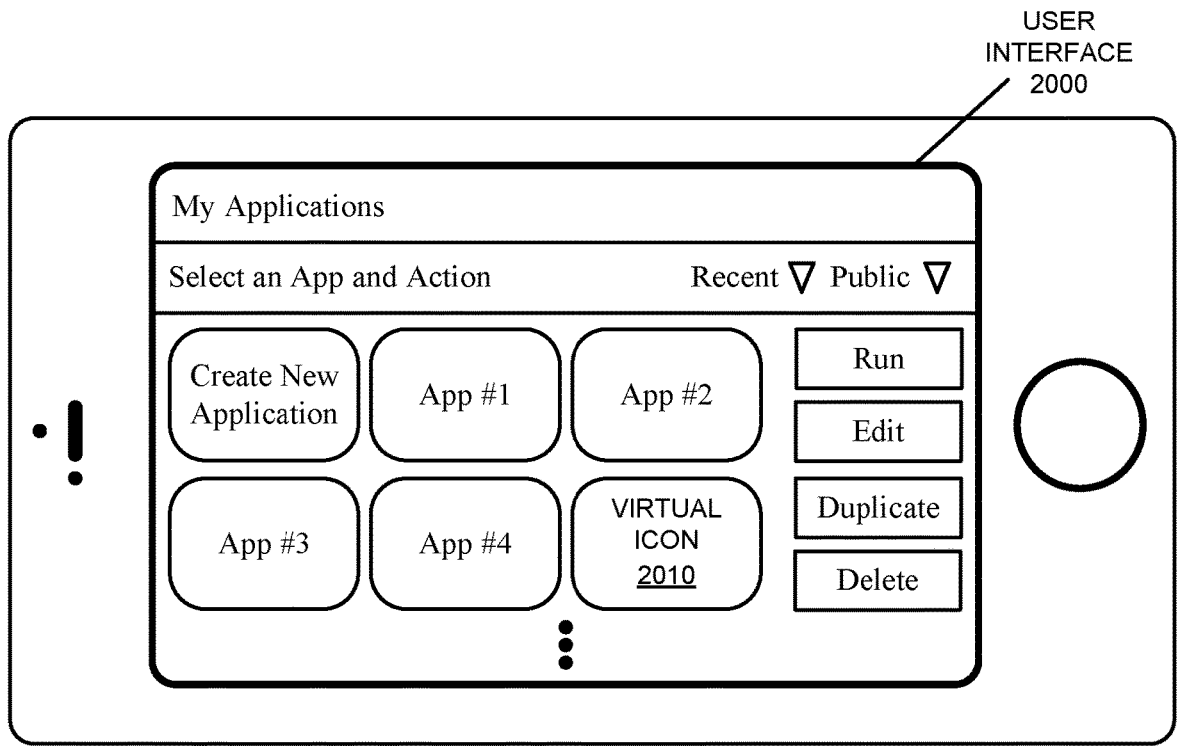
FIG. 20 is a drawing illustrating a user interface for use with an electronic device in FIG. 1 in accordance with an embodiment of the present disclosure.

The generated application (and its associated image) may be displayed and available for use on electronic device 110-1 (or electronic devices of any of the designated recipients or audience). This is shown in FIG. 20, which presents a drawing illustrating a user interface 2000 for use with electronic device 110-1 in FIG. 1. Notably, a virtual icon 2010 may be displayed for the application.

Figure 21:
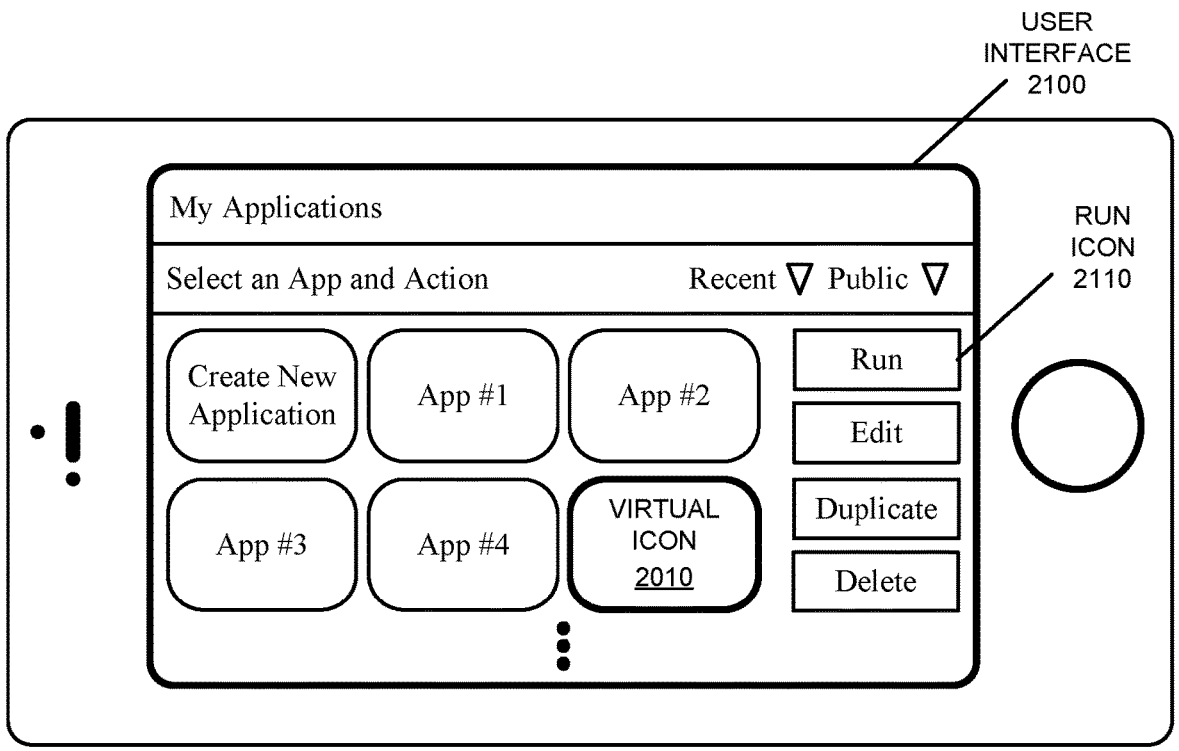
FIG. 21 is a drawing illustrating a user interface for use with an electronic device in FIG. 1 in accordance with an embodiment of the present disclosure.

As shown in FIG. 21, which presents a drawing illustrating a user interface 2100 for use with electronic device 110-1, 110-2 or 110-3 in FIG. 1, when the user selects virtual icon 2010 (such as by contacting the touch-sensitive display with a strike area associated with virtual icon 2010), a run icon 2110 may be highlighted (as indicated by the bold line in user interface 2100). If the user activates run icon 2110, the application may be launched.

Figure 22:
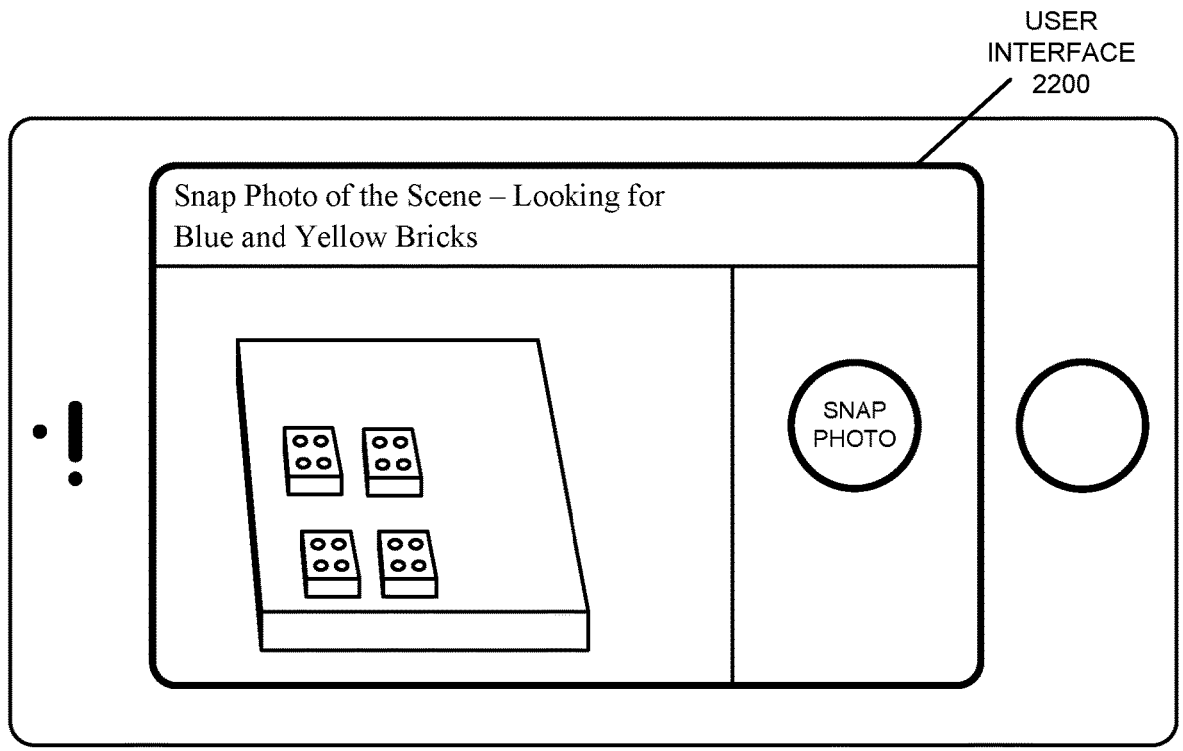
FIG. 22 is a drawing illustrating a user interface for use with an electronic device in FIG. 1 in accordance with an embodiment of the present disclosure.

As shown in FIG. 22, which presents a drawing illustrating a user interface 2200 for use with electronic device 110-1, 110-2 or 110-3 in FIG. 1, when the application is executed, the user may be prompted to center objects of interest in a current field of view of the image sensor. User interface 2200 may also provide a visual clue or indication to indicate what operations the application will perform on an acquired additional image (i.e., the one or more inspection criteria).

Figure 23:
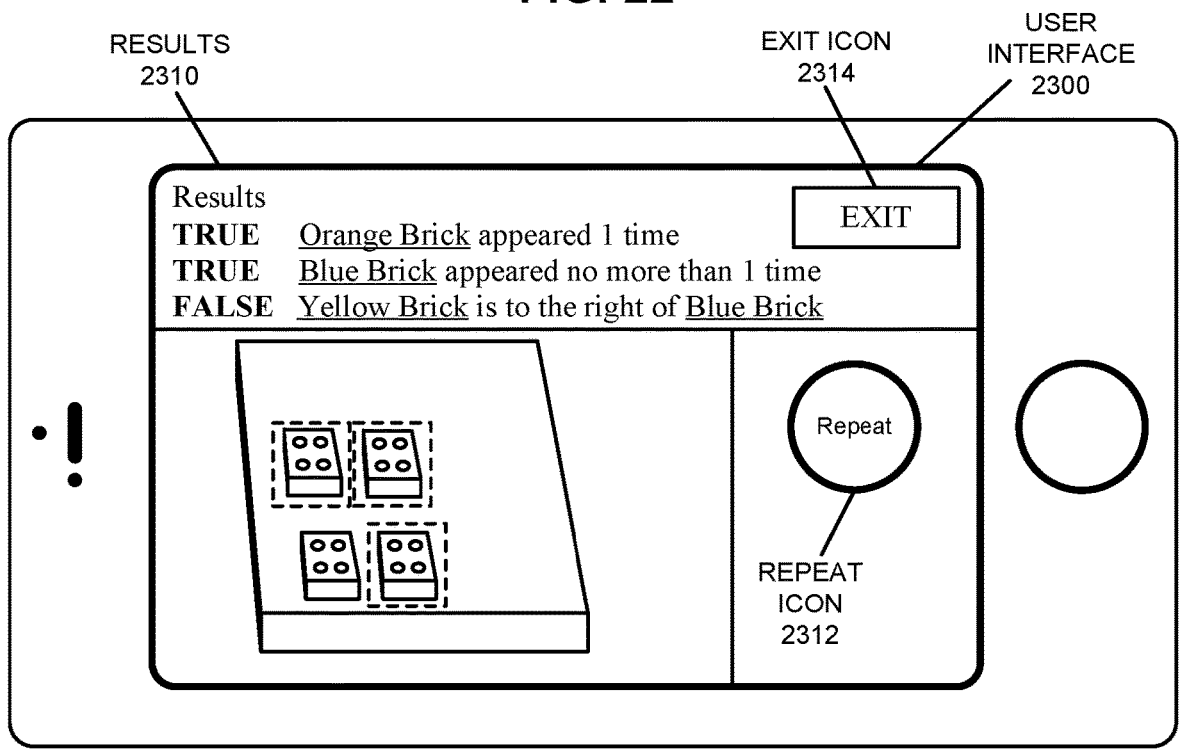
FIG. 23 is a drawing illustrating a user interface for use with an electronic device in FIG. 1 in accordance with an embodiment of the present disclosure.

Moreover, as shown in FIG. 23, which presents a drawing illustrating a user interface 2300 for use with electronic device 110-1, 110-2 or 110-3 in FIG. 1, when the user acquires an additional image, the application may apply or perform the one or more inspection criteria to determine results 2310. The user may repeat the proceeding operations in the application by activating a repeat icon 2312. Alternatively, the user may activate an exit icon 2314, which may result in a report being generated and stored and/or provided to one or more designated destinations.

In some embodiments, one or more of the previous embodiments of the user interfaces may include fewer or more user-interface objects or features, one or more different user-interface objects or features, one or more user-interface objects or features may be repositioned and/or one or more user-interface objects or features may be changed.

While the preceding discussion illustrated the generating technique analyzing one image at a time, in some embodiments the generating technique may probabilistically combine classifications from multiple frames in a sequence. Notably, multiple images may be used in one or more ways. For example, multiple images of a scene may be acquired from different points of view in order to train object detection and classification. Moreover, multiple frames may be processed independently, such as in batch and monitoring use-cases. Furthermore, evidence may be integrated across multiple frames, which may allow a state vector that localizes objects and the camera for each frame to be probabilistically updated.

Note that 'scene understanding' in the generating technique (e.g., analyzing an image to determine relationships among objects and scene composition) may depend on 'localization.' This may involve creating a 3D coordinate system of the world and locating the camera as well as the detected objects in this coordinate system. In some embodiments, such localization may be facilitated using fiducial markers and/or SLAM. Moreover, in order to perform scene understanding, objects in an image may be localized. Then, the objects detected and classified in the image may be registered to the 3D world. SLAM may facilitate this operation because it provides a map of 3D points, which can correspond to objects. While this cannot be performed with the markers, the markers may be used to find or identify planes in the world, e.g., by sticking markers on tables, walls and floors. This may allow an affine transformation to be created, which may map image points to 3D points on planes in the world.

As noted previously, the type of localization used may depend on the capabilities of an electronic device. For example, if a camera is available, and the camera moves, visual SLAM may be used. Alternatively, with a depth-sensitive camera, depth SLAM (which uses the depth camera to create a 3D voxel view of the world) may be used. Alternatively, if an electronic device includes a gyroscope and an accelerometry, their outputs may be combined and visual-inertial SLAM (which uses the accelerometer and gyroscope to track movement, using the camera to correct for drift) to be used.

We now describe embodiments of an electronic device, which may perform at least some of the operations in the generating technique. FIG. 24 presents a block diagram illustrating an example of an electronic device 2400 in accordance with some embodiments, such as one of electronic device 110-1, electronic device 110-2, electronic device 110-3, access point 112, base station 114 or computer 120. This electronic device includes processing subsystem 2410, memory subsystem 2412, and networking subsystem 2414. Processing subsystem 2410 includes one or more devices configured to perform computational operations. For example, processing subsystem 2410 can include one or more microprocessors, ASICs, microcontrollers, programmable-logic devices, one or more graphics process units (GPUs) and/or one or more digital signal processors (DSPs).

Memory subsystem 2412 includes one or more devices for storing data and/or instructions for processing subsystem 2410 and networking subsystem 2414. For example, memory subsystem 2412 can include dynamic random access memory (DRAM), static random access memory (SRAM), and/or other types of memory. In some embodiments, instructions for processing subsystem 2410 in memory subsystem 2412 include: one or more program modules or sets of instructions (such as program instructions 2422 or operating system 2424), which may be executed by processing subsystem 2410. Note that the one or more computer programs may constitute a computer-program mechanism. Moreover, instructions in the various modules in memory subsystem 2412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2410.

In addition, memory subsystem 2412 can include mechanisms for controlling access to the memory. In some embodiments, memory subsystem 2412 includes a memory hierarchy that comprises one or more caches coupled to a memory in electronic device 2400. In some of these embodiments, one or more of the caches is located in processing subsystem 2410.

In some embodiments, memory subsystem 2412 is coupled to one or more high-capacity mass-storage devices (not shown). For example, memory subsystem 2412 can be coupled to a magnetic or optical drive, a solid-state drive, or another type of mass-storage device. In these embodiments, memory subsystem 2412 can be used by electronic device 2400 as fast-access storage for often-used data, while the mass-storage device is used to store less frequently used data.

Networking subsystem 2414 includes one or more devices configured to couple to and communicate on a wired and/or wireless network (i.e., to perform network operations), including: control logic 2416, an interface circuit 2418 and one or more antennas 2420 (or antenna elements). (While FIG. 24 includes one or more antennas 2420, in some embodiments electronic device 2400 includes one or more nodes, such as nodes 2408, e.g., a network node that can be connected or coupled to a network, or a pad that can be coupled to the one or more antennas 2420. Thus, electronic device 2400 may or may not include the one or more antennas 2420.) For example, networking subsystem 2414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 2414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2400 may use the mechanisms in networking subsystem 2414 for performing simple wireless communication between the electronic devices, e.g., transmitting advertising or beacon frames and/or scanning for advertising frames transmitted by other electronic devices as described previously.

Within electronic device 2400, processing subsystem 2410, memory subsystem 2412, and networking subsystem 2414 are coupled together using bus 2428. Bus 2428 may include an electrical, optical, and/or electro-optical connection that the subsystems can use to communicate commands and data among one another. Although only one bus 2428 is shown for clarity, different embodiments can include a different number or configuration of electrical, optical, and/or electro-optical connections among the subsystems.

In some embodiments, electronic device 2400 includes a display subsystem 2426 for displaying information on a display, which may include a display driver and the display, such as a liquid-crystal display, a multi-touch touchscreen, etc.

Electronic device 2400 can be (or can be included in) any electronic device with at least one network interface. For example, electronic device 2400 can be (or can be included in): a desktop computer, a laptop computer, a subnotebook/netbook, a server, a tablet computer, a smartphone, a cellular telephone, a smartwatch, a consumer-electronic device, a portable computing device, a drone, a headset (such as an augmented-reality headset or a virtual-reality headset), a camera (such as a security camera), a camera coupled with deep learning, a depth-sensitive camera (such as a stereoscopic camera, a time-of-flight camera, a camera that uses structured light, etc.), an infrared camera, a smart speaker, a smart doorbell (which may include a camera), smart glasses, a robot, an access point, a transceiver, a router, a switch, communication equipment, a base station, a controller, test equipment, and/or another electronic device.

Although specific components are used to describe electronic device 2400, in alternative embodiments, different components and/or subsystems may be present in electronic device 2400. For example, electronic device 2400 may include one or more additional processing subsystems, memory subsystems, networking subsystems, and/or display subsystems. Additionally, one or more of the subsystems may not be present in electronic device 2400. Moreover, in some embodiments, electronic device 2400 may include one or more additional subsystems that are not shown in FIG. 24. Also, although separate subsystems are shown in FIG. 24, in some embodiments some or all of a given subsystem or component can be integrated into one or more of the other subsystems or component(s) in electronic device 2400. For example, in some embodiments program instructions 2422 are included in operating system 2424 and/or control logic 2416 is included in interface circuit 2418. In some embodiments, the generating technique is implemented using information in layer 2 and/or layer 3 of the Open System Interconnection model.

Moreover, the circuits and components in electronic device 2400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2414 (or, more generally, of electronic device 2400). The integrated circuit may include hardware and/or software mechanisms that are used for transmitting wireless signals from electronic device 2400 and receiving signals at electronic device 2400 from other electronic devices. Aside from the mechanisms herein described, radios are generally known in the art and hence are not described in detail. In general, networking subsystem 2414 and/or the integrated circuit can include any number of radios. Note that the radios in multiple-radio embodiments function in a similar way to the described single-radio embodiments.

In some embodiments, networking subsystem 2414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a Wi-Fi communication protocol and a cellular-telephone communication protocol as an illustrative example, in other embodiments a wide variety of communication protocols and, more generally, wired and/or wireless communication techniques may be used. Thus, the generating technique may be used in a variety of network interfaces. Furthermore, while some of the operations in the preceding embodiments were implemented in hardware or software, in general the operations in the preceding embodiments can be implemented in a wide variety of configurations and architectures.

Therefore, some or all of the operations in the preceding embodiments may be performed in hardware, in software or both. For example, at least some of the operations in the generating technique may be implemented using program instructions 2422, operating system 2424 (such as a driver for interface circuit 2418) or in firmware in interface circuit 2418. Alternatively or additionally, at least some of the operations in the generating technique may be implemented in a physical layer, such as hardware in interface circuit 2418.

Moreover, while the generating technique was illustrated using one or more images, in other embodiments a wide variety of sensor or measurement inputs may be used, such as: a radio-frequency identifier, a weight, audio-based recognition and localization, etc.

While the preceding discussion illustrated the generating technique using an augmented-reality application, in other embodiments the generating technique may be used with non-augmented reality application. For example, the generating technique may be used in a batch-style use-case, in which a video feed is captured or streamed for analysis (i.e., an off-line use case, as opposed to a real-time augmented-reality use case). In these embodiments, the video may be processed frame-by-frame, and events may be ordered according to timestamps. Note that an event may be moving an object from a scene, adding an object to a scene, removing an object from a screen, or changing the state of an object. Moreover, a report may be triggered that summarizes the events. For example, in a medical application, where a camera observes a mat with medical instruments, an event may be triggered each time an instrument is removed from the mat, is used, and/or is added to the tray. The resulting report may summarize when and which instruments were used.

Note that the batch-style use-case may also be used in a real-time monitoring mode. Notably, instead of sending a report at the end, the application may provide an alert while processing frames from the camera in real-time. This approach may be used, e.g., in a retail scenario, such as when a camera detects that there are no more of a certain high-value item on a shelf and alerts the staff to replenish the item.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the generating technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an image sensor configured to selectively acquire an image of an environment that comprises objects;
   a display;
   an interface circuit configured to communicate with a computer;
   a processor, coupled to the image sensor, the display, the interface circuit and a memory, configured to execute the program instructions; and
   the memory configured to store the program instructions, wherein, when executed by the processor, the program instructions cause the electronic device to perform operations comprising:
   displaying a current field of view of the image sensor;
   in response to an image-acquisition input, acquiring the image using the image sensor;
   identifying and selecting at least a subset of the objects based at least in part on analysis of the image;
   receiving classifications for objects in the subset;
   determining one or more inspection criteria associated with at least the subset of the objects based at least in part on analysis of a context of at least the subset of the objects in the image, wherein the one or more inspection criteria correspond to one or more attributes of the objects in the subset; and
   receiving publishing instructions that specify an audience and privacy settings for an application for use in conjunction with instances of a second electronic device, wherein the publishing instructions specify one or more recipients of the application, and
   wherein the application is configured to perform analysis of one or more additional images based at least in part on the classifications and the one or more inspection criteria.

2. The electronic device of claim 1, wherein the analysis of the image comprises one of:
   providing the image intended for the computer; and
   receiving object information associated with the computer, wherein the object information corresponds to the one or more objects; or
   determining the object information by performing image analysis.

3. The electronic device of claim 1, wherein the operations comprise receiving a revision to at least the subset of the objects; and
   wherein the revision adds or removes an object from at least the subset of the objects.

4. The electronic device of claim 1, wherein the operations comprise providing recommended classifications for the objects in the subset; and
   wherein the received classifications for the objects in the subset are based at least in part on the recommended classifications.

5. The electronic device of claim 4, wherein receiving the classifications comprises receiving acceptance of the recommended classifications.

6. The electronic device of claim 4, wherein receiving the classifications comprises receiving revisions to the recommended classifications.

7. The electronic device of claim 1, wherein the classifications comprise names for the objects in the subset.

8. The electronic device of claim 1, wherein the one or more inspection criteria are determined based at least in part on provided questions associated with the one or more attributes and received answers associated with the one or more attributes.

9. The electronic device of claim 8, wherein the received answers comprise a revision to at least one of the one or more attributes.

10. The electronic device of claim 1, wherein the analysis of the context is performed on the electronic device, remotely by the computer or both.

11. The electronic device of claim 1, wherein the one or more attributes comprise one or more of: a spatial arrangement of the objects in the subset, an order of the objects in the subset, a pattern corresponding to the objects in the subset, a number of the objects in the subset, one or more numerical values corresponding to the objects in the subset, or an orientation of the objects in the subset.

12. The electronic device of claim 1, wherein the operations comprise receiving a revision to the one or more attributes.

13. The electronic device of claim 1, wherein the operations comprise providing, using the interface circuit, the publishing instructions and the privacy settings intended for the computer.

14. The electronic device of claim 1, wherein the operations comprise:
generating the application based at least in part on the classifications and the one or more inspection criteria; and
providing, using the interface circuit, the application intended for the computer.

15. A non-transitory computer-readable storage medium for use in conjunction with an electronic device, the computer-readable storage medium storing program instructions that, when executed by the electronic device, causes the electronic device to perform operations comprising:
displaying a current field of view of the image sensor;
in response to an image-acquisition input, acquiring the image using the image sensor;
identifying and selecting at least a subset of the objects based at least in part on analysis of the image;
receiving classifications for objects in the subset;
determining one or more inspection criteria associated with at least the subset of the objects based at least in part on analysis of a context of at least the subset of the objects in the image, wherein the one or more inspection criteria correspond to one or more attributes of the objects in the subset; and
receiving publishing instructions that specify an audience and privacy settings for an application for use in conjunction with instances of a second electronic device, wherein the publishing instructions specify one or more recipients of the application, and
wherein the application is configured to perform analysis of one or more additional images based at least in part on the classifications and the one or more inspection criteria.

16. The non-transitory computer-readable storage medium of claim 15, wherein the operations comprise receiving a revision to at least the subset of the objects; and
wherein the revision adds or removes an object from at least the subset of the objects.

17. The non-transitory computer-readable storage medium of claim 15, wherein the operations comprise providing recommended classifications for the objects in the subset; and
wherein the received classifications for the objects in the subset are based at least in part on the recommended classifications.

18. The non-transitory computer-readable storage medium of claim 15, wherein the one or more inspection criteria are determined based at least in part on provided questions associated with the one or more attributes and received answers associated with the one or more attributes.

19. The non-transitory computer-readable storage medium of claim 15, wherein the one or more attributes comprise one or more of: a spatial arrangement of the objects in the subset, an order of the objects in the subset, a pattern corresponding to the objects in the subset, a number of the objects in the subset, one or more numerical values corresponding to the objects in the subset, or an orientation of the objects in the subset.

20. A method for specifying or determining information associated with an application, comprising:
by an electronic device:
displaying a current field of view of the image sensor;
in response to an image-acquisition input, acquiring the image using the image sensor;
identifying and selecting at least a subset of the objects based at least in part on analysis of the image;
receiving classifications for objects in the subset;
determining one or more inspection criteria associated with at least the subset of the objects based at least in part on analysis of a context of at least the subset of the objects in the image, wherein the one or more inspection criteria correspond to one or more attributes of the objects in the subset; and
receiving publishing instructions that specify an audience and privacy settings for the application for use in conjunction with instances of a second electronic device, wherein the publishing instructions specify one or more recipients of the application, and
wherein the application is configured to perform analysis of one or more additional images based at least in part on the classifications and the one or more inspection criteria.

* * * * *